United States Patent
Davidchuk et al.

(10) Patent No.: US 9,940,411 B2
(45) Date of Patent: Apr. 10, 2018

(54) SYSTEMS AND METHODS OF BYPASSING SUPPRESSION OF EVENT BUBBLING FOR POPUP CONTROLS

(71) Applicant: salesforce.com, inc., San Francisco, CA (US)

(72) Inventors: Matthew Davidchuk, San Francisco, CA (US); Benjamin Snyder, Oakland, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 376 days.

(21) Appl. No.: 14/690,151

(22) Filed: Apr. 17, 2015

(65) Prior Publication Data

US 2016/0306527 A1 Oct. 20, 2016

(51) Int. Cl.
| | |
|---|---|
| *H04N 1/00* | (2006.01) |
| *G06F 3/0481* | (2013.01) |
| *G06F 9/44* | (2006.01) |
| *G06F 17/30* | (2006.01) |
| *G06F 9/455* | (2018.01) |

(52) U.S. Cl.
CPC ......... *G06F 17/30994* (2013.01); *G06F 8/38* (2013.01); *G06F 9/4443* (2013.01); *G06F 9/45504* (2013.01)

(58) Field of Classification Search
None
See application file for complete search history.

(56) References Cited

U.S. PATENT DOCUMENTS

| 5,566,330 A | 10/1996 | Sheffield |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

Javascript Tutorial, "Bubbling and Capturing," http://javascript.info/tutorial/bubbling-and-capturing, Ilya Kantor, 2011, 5 pages, accessed Mar. 30, 2015.

(Continued)

*Primary Examiner* — Jeffrey A Gaffin
*Assistant Examiner* — Nhat-Huy T. Nguyen
(74) *Attorney, Agent, or Firm* — Haynes Beffel & Wolfeld, LLP; Ernest J. Beffel, Jr.

(57) ABSTRACT

The technology disclosed describes systems and methods for implementing extensible browser executable components, such as popup controls for action, checkbox and radio button dropdown menus, modals, dialogs, date pickers and autocompletes. The disclosed technology systems and methods can also be used for rendering executable components for mobile application interfaces. The technology further discloses systems and methods for providing support for developers whose goal is to render specific implementations of browser executable components. The technology disclosed also describes systems and methods for bypassing suppression of DOM click event bubbling for a popup controls for action, checkbox and radio button dropdown menus, modals, dialogs, date pickers and autocompletes; and discloses systems and methods for implementing modal interaction between an iframe and a popup control.

19 Claims, 32 Drawing Sheets

Click Event Blocked & Mouseup Event Propagates Through

(56) References Cited

U.S. PATENT DOCUMENTS

| | | | |
|---|---|---|---|
| 5,805,167 A * | 9/1998 | van Cruyningen | G06F 3/0482 |
| | | | 715/808 |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,118,451 A * | 9/2000 | Alexander | G06F 3/0481 |
| | | | 715/809 |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,232,971 B1 * | 5/2001 | Haynes | G06F 9/4443 |
| | | | 715/800 |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,938,041 B1 | 8/2005 | Brandow et al. | |
| 7,062,502 B1 | 6/2006 | Kesler | |
| 7,069,231 B1 | 6/2006 | Cinarkaya et al. | |
| 7,069,497 B1 | 6/2006 | Desai | |
| 7,181,758 B1 | 2/2007 | Chan | |
| 7,216,298 B1 | 5/2007 | Ballard et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,401,288 B2 | 7/2008 | Atkin et al. | |
| 7,412,455 B2 | 8/2008 | Dillon | |
| 7,508,789 B2 | 3/2009 | Chan | |
| 7,519,956 B2 | 4/2009 | Fukuda et al. | |
| 7,603,483 B2 | 10/2009 | Psounis et al. | |
| 7,620,655 B2 | 11/2009 | Larsson et al. | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,140,489 B2 | 3/2012 | Yee et al. | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,756,275 B2 | 6/2014 | Jakobson | |
| 8,769,004 B2 | 7/2014 | Jakobson | |
| 8,769,017 B2 | 7/2014 | Jakobson | |
| 8,924,883 B2 | 12/2014 | Eischeid et al. | |
| 2001/0044791 A1 | 11/2001 | Richter et al. | |
| 2002/0070963 A1 | 6/2002 | Odero et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0161805 A1 | 10/2002 | Harris | |
| 2002/0162090 A1 | 10/2002 | Parnell et al. | |
| 2002/0165742 A1 | 11/2002 | Robins | |
| 2003/0001893 A1 | 1/2003 | Haley | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015862 A1 | 1/2004 | Dunn | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0199870 A1 | 10/2004 | Anderson | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |

(56) References Cited

U.S. PATENT DOCUMENTS

| | | |
|---|---|---|
| 2005/0091098 A1 | 4/2005 | Brodersen et al. |
| 2005/0108344 A1 | 5/2005 | Tafoya et al. |
| 2005/0273762 A1 | 12/2005 | Lesh |
| 2006/0021019 A1 | 1/2006 | Hinton et al. |
| 2006/0090138 A1 | 4/2006 | Wang et al. |
| 2006/0195819 A1 | 8/2006 | Chory et al. |
| 2006/0271864 A1* | 11/2006 | Satterfield ............. G06F 3/0481 715/764 |
| 2007/0028214 A1 | 2/2007 | Shu et al. |
| 2007/0074167 A1 | 3/2007 | Cohrs et al. |
| 2007/0294646 A1 | 12/2007 | Timmons |
| 2008/0077858 A1 | 3/2008 | Asakawa et al. |
| 2008/0249972 A1 | 10/2008 | Dillon |
| 2008/0256436 A1 | 10/2008 | Atkin et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0205523 A1 | 8/2010 | Lehota et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0166989 A1* | 6/2012 | Brown .................. G06F 3/0486 715/768 |
| 2012/0167047 A1 | 6/2012 | Wyler et al. |
| 2012/0233137 A1 | 9/2012 | Jakobson et al. |
| 2012/0290407 A1 | 11/2012 | Hubbard et al. |
| 2013/0073949 A1 | 3/2013 | Barrell et al. |
| 2013/0104029 A1 | 4/2013 | Hendry et al. |
| 2013/0212497 A1 | 8/2013 | Zelenko et al. |
| 2013/0247216 A1 | 9/2013 | Cinarkaya et al. |
| 2013/0332815 A1 | 12/2013 | Gallo et al. |
| 2014/0229920 A1 | 8/2014 | Rossi |
| 2014/0280771 A1 | 9/2014 | Bosworth et al. |
| 2015/0089406 A1 | 3/2015 | Trefler et al. |

OTHER PUBLICATIONS

WAI-ARIA 1.0 Authoring Practices, W3C Working Draft Mar. 7, 2013, 66 pgs. [Retrieved Mar. 24, 2015] Retrieved from the internet: <URL:http://www.w3.org/TR/wai-aria-practices/#menu>.

Accessibility. 2014 Microsoft. [retreived Dec. 1, 2014] Retrieved from the Internet: <URL: http://msdn.microsoft.com/en-us/library/ms753399(d=printer, v=vs.110).aspx]>.

U.S. Appl. No. 14/693,766—Office Action dated Jun. 23, 2016, 22 pages.

Web Content Accessibility Guidelines (WCAG) 2.0 <http://www.w3.org/TR/WCAG>, 2008, retrieved Sep. 24, 2016, 30 pages.

W3C®, "How to Make Presentations Accessible to All" Upated Feb. 20, 2012, <http://www.w3.org/WAI/training/accessible.php> retrieved Sep. 24, 2016, 2 pages.

U.S. Appl. No. 14/693,766—Final Office Action dated Dec. 22, 2016, 32 pages.

Peterson, Clarissa "Accessibility in HTML5", Nov. 19, 2012, 14 pages [Retrieved on Dec. 15, 2016] Retrieved from the internet < http://www.clarissapeterson.com/2012/II/html5-accessibility/>.

U.S. Appl. No. 14/693,766—Response to Office Action dated Jun. 23, 2016 filed Sep. 23, 2016, 13 pages.

U.S. Appl. No. 14/693,766—Response to Final Office Action dated Dec. 22, 2016 filed Feb. 16, 2017, 13 pages.

U.S. Appl. No. 14/693,766—Advisory Action dated Mar. 6, 2017, 8 pages.

U.S. Appl. No. 14/693,766—Response to Advisory Action dated Mar. 6, 2017 filed Mar. 22, 2017, 17 pages.

The Mobile Web Handbook, "Advanced event registration models", http://www.quirksmode.org/js/events_advanced.html, 2005, 11 pages.

* cited by examiner

Fig. 1 Development Subsystem

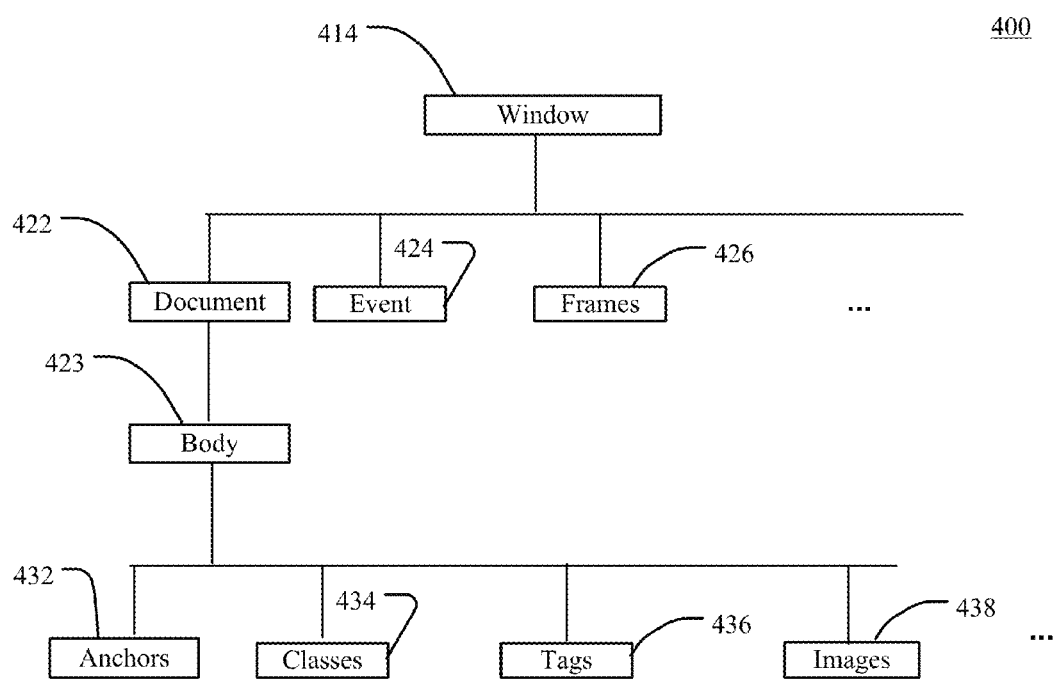
Fig. 4 DOM popup.cmp ⟋ 510

```
<aura:component extensible="true" implements="ui:visible" description="A popup with a
trigger that controls its visibility." support="GA">
   <aura:registerEvent name="popupTriggerPress" type="ui:popupTriggerPress"
description="The event fired when the popup trigger is pressed. Other components may
also fire this event to simulate a trigger press."/>
   <aura:registerEvent name="popupTargetShow" type="ui:popupTargetShow"
description="The trigger fires this event to show the target. Other components may also
fire this event to show the target."/>
   <aura:registerEvent name="popupTargetHide" type="ui:popupTargetHide"
description="The trigger fires this event to hide the target. Other components may also
fire this event to hide the target."/>
   <aura:registerEvent name="popupKeyboardEvent" type="ui:popupKeyboardEvent"
description="The event fired when a user interacts with a popup via the keyboard."/>
   <aura:registerEvent name="refresh" type="ui:refresh" description="Fire this event to
refresh the popup"/>

<aura:handler name="init" value="{!this}" action="{!c.doInit}"/>
   <aura:handler name="popupTriggerPress" action="{!c.onTriggerPress}"/>
   <aura:handler name="popupTargetShow" action="{!c.onTargetShow}"/>
   <aura:handler name="popupTargetHide" action="{!c.onTargetHide}"/>
   <aura:handler name="popupKeyboardEvent" action="{!c.onKeyboardEvent}"/>
   <aura:handler name="refresh" action="{!c.onRefresh}"/>

<div aura:id="app" class="{!v.class}">
      {!v.body}
   </div>
</aura:component>
``` popupRenderer.js ⟋ 514

```
({
   afterRender: function(component, helper) {
      var concreteCmp = component.getConcreteComponent();
      var _helper = concreteCmp.getDef().getHelper();
      var target = _helper.getTargetComponent(component);
        var trigger = _helper.getTriggerComponent(component);

if (target && trigger) {
       var targetElement = _helper.findElement(trigger, "popupTriggerElement");
       if (targetElement) {
          target.set("v.referenceElement", targetElement);
       }
      } this.superAfterRender();
   }
})
```

Fig. 5 popup.cmp & popupRenderer.js

Fig. 6 popupController.js

```
popupHelper.js        ╱⎺ 710
({
    getTargetComponent : function(component){
        return this.getComponent(component, "ui:popupTarget");
    },
    getTriggerComponent : function(component){
        return this.getComponent(component, "ui:popupTrigger");
    },
    getComponent: function(component, componentName){
        var body = component.getConcreteComponent().get("v.body"),
            child;
        if (!$A.util.isUndefinedOrNull(componentName)) {
            for (var i = 0; i < body.length; i++) {
                child = body[i];

if (child.isInstanceOf('ui:scroller')) {
                    return this.getComponent(child, componentName);
                } else if (child.isInstanceOf(componentName)) {
                    return child;
                }
            }
        }
    },                          ╱⎺ 740
    handleTriggerPress : function(component) {
        this.setTargetVisibility(component, !this.getTargetComponent(component).get("v.visible"));
    },                  ╱⎺ 750
    handleTargetShow : function(component) {
        this.setTargetVisibility(component, true);
    },              ╱⎺ 760
    handleTargetHide : function(component) {
        this.setTargetVisibility(component, false);       ╱⎺ 770
    },
    handleKeyboardEvent : function(component, event) {
        this.delegateEventToTarget(component, event, 'e.popupKeyboardEvent');
    },
    setTargetVisibility : function(component, visible) {
        var target = this.getTargetComponent(component);
        target.set("v.visible", visible);
    },
    delegateEventToTarget: function(component, event, eventName) {
        var target = this.getTargetComponent(component),
            targetEvent = target.get(eventName);

targetEvent.setParams({
            event : event
        });
        targetEvent.fire();
    },
```

Fig. 7 popupHelper.js - part 1 of 2 popupHelper.js part 2 of 2

```javascript
    setEventHandlersOnChildren : function(component) {
        var body = component.getConcreteComponent().get("v.body"),
            child;
        for (var i = 0, l = body.length; i < l; i++) {
            child = body[i];
            if (child.isInstanceOf("ui:popupTrigger")) {
                this.setTriggerEventHandlers(component, child);
            }
            if (child.isInstanceOf("ui:popupTarget")) {
                this.setTargetEventHandlers(component, child);
            }
        }
    },                          /⎯ 840
    setTriggerEventHandlers : function(component, childComponent) {
        childComponent.addHandler("popupTriggerPress", component, "c.onTriggerPress");
        childComponent.addHandler("popupTargetShow", component, "c.onTargetShow");
        childComponent.addHandler("popupTargetHide", component, "c.onTargetHide");
        childComponent.addHandler("popupKeyboardEvent", component, "c.onKeyboardEvent");
    },
    setTargetEventHandlers : function(component, targetComponent) {
        this.addCloseHandler(component, targetComponent);
    },
    addCloseHandler : function(component, childComponent) {
        childComponent.addHandler("doClose", component, "c.onTargetHide");
    },
    handleRefresh: function(component) {
        this.setEventHandlersOnChildren(component);
    },
    findElement: function(component, localId) {
        var cmp = component.getConcreteComponent();
        var retCmp = null;
        while (cmp) {
            retCmp = cmp.find(localId);
            if (retCmp) {
                break;
            }
            cmp = cmp.getSuper();
        }
        var elem = retCmp ? retCmp.getElement() : null;

return elem;
    }
})
```

Fig. 8 popupHelper.js - part 2 of 2 popupTrigger.cmp ⟋ 910

```
<aura:component extensible="true" extends="ui:interactive" description="A trigger that
expands and collapses a menu, used in a ui:menu component." support="GA">
    <aura:attribute access="GLOBAL" name="title" type="String" default=""
description="The text to display as a tooltip when the mouse pointer hovers over this
component."/>
    <aura:attribute name="trigger" type="Aura.Component[]" description="Used to
override the default HTML and trigger event handling. If used, developer must trigger
show/hide events for popup target since v.trigger is not wrapped in a link tag, it is
wrapped in a plain div."/>
    <aura:attribute name="stopClickPropagation" type="Boolean" default="false"
description="Prevents the click event from bubbling up the DOM tree, preventing any
parent handlers from being notified of the event."/>
```
⟋ 930

```
    <aura:registerEvent name="popupTriggerPress" type="ui:popupTriggerPress"
description="The event fired when a popup trigger is pressed."/>
```
⟋ 940
```
    <aura:registerEvent name="popupTargetShow" type="ui:popupTargetShow"
description="The trigger fires this event to show the target."/>
```
⟋ 950
```
    <aura:registerEvent name="popupTargetHide" type="ui:popupTargetHide"
description="The trigger fires this event to hide the target."/>
```
⟋ 960
```
    <aura:registerEvent name="popupKeyboardEvent" type="ui:popupKeyboardEvent"
description="The event fired when a user interacts with a popup via the keyboard."/>

<aura:handler event="ui:popupTargetToggle" action="{!c.onPopupToggle}"/>

<div id="{!globalId}" aura:id="popupTrigger" aria-haspopup="true">
        <aura:if isTrue="{!v.trigger.length > 0}">
            <div aura:id="popupTriggerElement">
                {!v.trigger}
            </div>

<aura:set attribute="else">
                <a aura:id="popupTriggerElement" title="{!v.title}" class="{!v.class}"
onclick="{!c.onClick}">
                    <aura:if isTrue="{!v.label != null}">
                        {!v.label}
                        <aura:set attribute="else">
                            {!v.body}
                        </aura:set>
                    </aura:if>
```
⟋ 980
```
                    <span class="assistiveText">{!v.title}</span>
                </a>
            </aura:set>
        </aura:if>
    </div>
</aura:component>
```

Fig. 9 popupTrigger.cmp

1000 popupTriggerController.js ⟵ 1010

```
({
    focus: function(component, event, helper) {
        var concreteCmp = component.getConcreteComponent();
        var _helper = concreteCmp.getDef().getHelper();
        _helper.focus(concreteCmp);
    },
```
⟵ 1020
```
    onClick : function(component, event) {
        var concreteCmp = component.getConcreteComponent();
        var _helper = concreteCmp.getDef().getHelper();
        if ($A.util.getBooleanValue(concreteCmp.get("v.stopClickPropagation"))) {
            $A.util.squash(event.getParam("domEvent"), true);
        }
        _helper.handleClick(component, event);
    }, /*
    * popupToggle.evt is an event that custom trigger events can broadcast
    * which is caught by popup and responded to accordingly
    */
```
⟵ 1030
```
    onPopupToggle : function(component, event, helper) {
        helper.handlePopupToggle(component, event);
    }
})
``` popupTriggerRenderer.js ⟵ 1040

⟵ 1050
```
({
    afterRender: function(component, helper) {
        helper.addTriggerDomEvents(component);
        return this.superAfterRender();
    },
```
⟵ 1060
```
    rerender: function(component, helper) {
        helper.addTriggerDomEvents(component);
        return this.superRerender();
    }
})
```

Fig. 10 popupTriggerController.js & popupTriggerRenderer.js

1100 popupTriggerHelper.js - part 1 of 2  ⎯⎯ 1110

```
({
    addTriggerDomEvents : function(component) {
        var events = ["click", "keydown"];
        for (var i=0, len=events.length; i < len; i++) {
            if (!component.hasEventHandler(events[i])) {
                this.addDomHandler(component, events[i]);
            }
        }
    }, /*
    * preEventFiring is a method from ui:interactive that is meant to be overridden
    * it allows developers to respond to dome events that are registered by
    addTriggerDomeEvents (see above)
    */                                                  ⎯⎯ 1140
    preEventFiring: function(component, event) {
        if (event.type === "keydown") {
            if (event.keyCode === 32) { // space key
                event.preventDefault();
                this.firePopupEvent(component, "e.popupTriggerPress");
            } else if (event.keyCode === 39 || event.keyCode === 40 || event.keyCode === 37 || event.keyCode === 38) { // right, down, left, or up key
                event.preventDefault();
                this.firePopupEvent(component, "e.popupTargetShow"); // for key arrows, we want to only show the target since the menu should stay visible so users can interact with it
            } else if (event.keyCode === 9 || event.keyCode === 27) { // tab or escape
                this.firePopupEvent(component, "e.popupTargetHide");
            } this.firePopupEvent(component, "e.popupKeyboardEvent", {
                event : event
            });
        }
    },
```

Fig. 11 popupTriggerHelper.js - part 1 of 2

1200 popupTriggerHelper.js - part 2 of 2

```
                                         ┌─ 1210
handleClick: function(component) {
    this.handleTriggerPress(component);
},
                                         ┌─ 1220
handleTriggerPress: function(component) {
    this.firePopupEvent(component, "e.popupTriggerPress");
},
                                         ┌─ 1230
showTarget: function(component) {
    this.firePopupEvent(component, "e.popupTargetShow");
},
                                         ┌─ 1240
hideTarget: function(component) {
    this.firePopupEvent(component, "e.popupTargetHide");
},
                                         ┌─ 1250
handlePopupToggle: function(component, event) {
    var triggerParams = event.getParams(),
            localTriggerDiv = component.find('popupTriggerElement').getElement(),
            eventTriggerDiv = triggerParams.component.getElement();

if ($A.util.contains(localTriggerDiv, eventTriggerDiv)) {
            if (triggerParams.show) {
                this.showTarget(component);
            } else {
                this.hideTarget(component);
            }
        }
},
                         ┌─ 1260
firePopupEvent: function(component, eventName, params) {
    var event = component.getConcreteComponent().get(eventName);
    if (params) {
    event.setParams(params);
    }
    event.fire();
  }
})
```

Fig. 12 popupTriggerHelper.js - part 2 of 2 popupTarget.cmp — 1310    13/32    1300

```
<aura:component extensible="true" implements="ui:visible" description="A container that is
displayed in response to a trigger event. If used in a mobile context, it is recommended that
curtain be set to true to prevent nested iframes from consuming the closeOnClickOutside event."
support="GA">
    <aura:attribute name="visible" type="Boolean" default="false" description="Controls the
visibility of the popup target. The default is false, which hides the menu."/>          1320
    <aura:attribute access="GLOBAL" name="closeOnTabKey" type="Boolean" default="true"
description="Indicates whether to close the target list on tab key or not." />    1330
    <aura:attribute access="GLOBAL" name="autoPosition" type="Boolean" default="true"
description="Move the popup target up when there is not enough space at the bottom to display.
Note: even if autoPosition is set to false, popup will still position the menu relative to the trigger.
To override default positioning, use manualPosition attribute."/>    1340
        <aura:attribute name="manualPosition" tvpe="Boolean" default="false" description="Flag
to override auto position." />           1350
    <aura:attribute name="attachToBody" type="Boolean" default="false" description="Move the
target up to HTML body level to make sure it is not blocked by others. "/>
    <aura:attribute name="referenceElement" type="Object" description="The reference node
which this target list should be positioned to. Usually it is a trigger element." />
    <aura:attribute access="GLOBAL" name="curtain" type="Boolean" default="false"
description="Whether or not to apply an overlay under the target." />    1360
    <aura:attribute access="GLOBAL" name="closeOnClickOutside" type="Boolean"
default="true" description="Close target when user clicks or taps outside of the target" />    1370
    <aura:attribute name="closeOnClickInside" type="Boolean" default="false"
description="Close target when user clicks or taps inside of the target" />
    <aura:attribute name="preTransitionClass" type="String" default="" description="This
CSS class is initially applied to the target then removed prior to toggling the visible class. This is
to allow for CSS transitions." />    1382
    <aura:registerEvent name="popupCollapse" type="ui:collapse" description="The event fired
when the popup target list collapses."/>    1384
    <aura:registerEvent name="popupExpand" type="ui:expand" description="The event fired
when the popup target list displays."/>    1386
    <aura:registerEvent name="popupKeyboardEvent" type="ui:popupKeyboardEvent"    1388
description="The event fired when the user interacts with the popup using the keyboard."/>
    <aura:registerEvent name="doClose" type="ui:collapse" description="Tell the target to close
itself."/>    1390
    <aura:handler name="popupKeyboardEvent" action="{!c.handleKeyboardEvent}"/>

<aura:if isTrue="{! v.attachToBody && v.curtain}">
            <div class="{!v.class + ' popupCurtain ' + v.preTransitionClass}">
                <div aura:id="popupTarget" class="popupTargetContainer">
                    {!v.body}
                </div>
            </div>
            <aura:set attribute="else">
                <div aura:id="popupTarget" class="{!v.class + ' popupTargetContainer ' +
v.preTransitionClass}">
                    {!v.body}
                </div>
            </aura:set>
        </aura:if>
</aura:component>
```

Fig. 13 popupTarget.cmp popupTargetController.js ─╱⁻ 1410
```
({
    handleKeyboardEvent: function(component, event, helper) {
        var _helper = component.getConcreteComponent().getDef().getHelper() || helper;
        _helper.handleKeyboardEvent(component.getConcreteComponent(), event);
    }
})
``` popupTargetRenderer.js ─╱⁻ 1414
```
({
    afterRender: function(component, helper) {
        var ret;

helper.setAriaAttributes(component);

ret = this.superAfterRender();

helper.position(component);

return ret;
    },

/*
     * rerender gets called when a property changes. So, we can rely on this method
     * to handle the visibility of the target when its visible attribute changes. This
     * is similar to attaching a change event to v.visible except that it works in instances
     * when this component is extended.
     */
    rerender: function(component, helper) {          ─╱⁻ 1418
        var ret = this.superRerender();
        helper.onVisibleChange(component);
        helper.setAriaAttributes(component);
        helper.position(component);
        return ret;
    },
    unrender: function(component, helper) {
        if (component._localElementCache) {
            // reset the element cache so that if component is rerendered it has a chance to refresh any changes
            // also, using undefined instead of delete as delete is really slow and undefined suffices in this scenario
            component._localElementCache = undefined;
        }
        helper.removeDismissEvents(component);
        this.superUnrender();
    }
})
```

Fig. 14 popupTargetController.js and popupTargetRenderer.js

```
popupTargetHelper.js
({                          ╭─ 1510
    /*
* Grab all the associated HTML and aura components based on the concrete component
* since we need to reference them multiple times in this helper. This provides that we
* only query for the components once, instead of each time a method is called.
*/
getElementCache: function(component) {   ╭─ 1512
        var o;
        if (!component._localElementCache) {
                o = {};
            o.target = component.getConcreteComponent(); // the instance of popupTarget
            o.targetElement = o.target.getElement(); // the root html element
            if (component.find("popupTarget")) { // this prevents extended components from throwing an error because they don't contain this element
                    o.targetDiv = component.find("popupTarget").getElement(); // the actual menu looking container that gets positioned relative to the trigger
            }
            o.triggerElement = component.getConcreteComponent().get("v.referenceElement");
            if (o.triggerElement) {
                o.trigger = this.getTriggerComponent(o.triggerElement);
            }
            component._localElementCache = o;
        }
        return component._localElementCache;
},
getTransitionEndEventName : function(component) {
var el,
        names;
if (!component._transitionEndEventName) {
    el = document.createElement('div');
        names = {
            'transition':'transitionend',
            'OTransition':'otransitionend',
            'MozTransition':'transitionend',
            'WebkitTransition':'webkitTransitionEnd'
        };
        for (var i in names) {
            if (names.hasOwnProperty(i) && typeof el.style[i] !== 'undefined') {
                    component._transitionEndEventName = names[i];
            }
        }
    }
    return component._transitionEndEventName;
},
```

Fig. 15 popupTargetHelper.js page 1 of 3 popupTargetHelper.js -- part 2 of 3
```
getTriggerComponent: function(element) {
        var htmlCmp =
$A.componentService.getRenderingComponentForElement(element);
var component = htmlCmp.getComponentValueProvider().getConcreteComponent();
while (component && !component.isInstanceOf("ui:popupTrigger")) {
        component =
component.getComponentValueProvider().getConcreteComponent();
}
return component;
},                                      ⌐ 1614
position: function(component) {
        var elements = this.getElementCache(component),
attachToBody = elements.target.get("v.attachToBody"),
                manualPosition = elements.target.get("v.manualPosition"),
                visible,
                autoPosition,
                elemRect,
                viewPort,
                height;

if (attachToBody === true) {
                this.positionAsBodyChild(component);
                return;
        }
if (elements.targetDiv && !manualPosition) {
        elements.targetDiv.style.top = "auto";
visible = elements.target.get("v.visible");

if (visible) {
        autoPosition = component.get('v.autoPosition');
elemRect = elements.targetDiv.getBoundingClientRect();
viewPort = $A.util.getWindowSize();

if (autoPosition && elemRect.bottom > viewPort.height) { // not enough space below
        // getBoundingClientRect method does not return height and width in IE7 and Ie8
        height = typeof elemRect.height != 'undefined' ? elemRect.height :
elemRect.bottom - elemRect.top;
        elements.targetDiv.style.top = 0 - height + "px";
} else {
elements.targetDiv.style.top = "auto";
}
}
}
},
```

Fig. 16 popupTargetHelper.js part 2 of 3

1700 popupTargetHelper.js – part 3 of 3 positionAsBodyChild: function(component) {  ⌒ 1710
    var elements = this.getElementCache(component),
        visible,
        manualPosition,
        triggerElementRect,
        elemRect,
        viewPort,
        width,
        height;
...

addDismissEvents : function(component) {  ⌒ 1714
    $A.util.on(document.body, this.getOnClickEventProp("onClickStartEvent"), this.getOnClickStartFunction(component));
$A.util.on(document.body, this.getOnClickEventProp("onClickEndEvent"), this.getOnClickEndFunction(component));

// window blur event is to hide/show menu when clicking on an iframe (as events do not bubble up and out of an iframe)
$A.util.on(window, "blur", this.getWindowBlurHandler(component));  ⌒ 1716
}, removeDismissEvents : function(component) {  ⌒ 1718
    $A.util.removeOn(document.body, this.getOnClickEventProp("onClickStartEvent"), this.getOnClickStartFunction(component));
    $A.util.removeOn(document.body, this.getOnClickEventProp("onClickEndEvent"), this.getOnClickEndFunction(component));
    $A.util.removeOn(window, "blur", this.getWindowBlurHandler(component));
}, /*
* This method is here for components that extend this one to hook into keyboard events
*/
handleKeyboardEvent : function(component, event) {  ⌒ 1719
}

...

Fig. 17 popupTargetHelper.js part 3 of 3

```
<div style="margin:20px;">                  1812
    <div style="display:inline-block;width:50%;vertical-align:top;">
        <code>ui:actionMenuItem</code>    1814
        <ui:menu>
            <ui:menuTriggerLink aura:id="trigger" label="Select your favorite team"/>
            <ui:menuList class="actionMenu" aura:id="actionMenu">
                <ui:actionMenuItem class="actionItem1" aura:id="actionItem1" label="Bayern Munich" click="{!c.updateTriggerLabel}"/>
                <ui:actionMenuItem class="actionItem2" aura:id="actionItem2" label="FC Barcelona" click="{!c.updateTriggerLabel}" disabled="true"/>
                <ui:actionMenuItem class="actionItem3" aura:id="actionItem3" label="Inter Milan" click="{!c.updateTriggerLabel}"/>
                <ui:actionMenuItem class="actionItem4" aura:id="actionItem4" label="Manchester United" click="{!c.updateTriggerLabel}"/>
            </ui:menuList>
        </ui:menu>
    </div>
</div>
```

```
                        1816
menuTriggerLink.cmp
<aura:component access="GLOBAL" support="GA" extensible="true"
extends="ui:menuTrigger" description="A link that triggers a dropdown menu.">
    <aura:attribute access="GLOBAL" name="label" type="String" description="The text
displayed on the component."/>

<a aura:id="link" class="{!v.class}" title="{!v.title}">
        <aura:if isTrue="{!v.body.length == 0}">
            {!v.label}
            <aura:set attribute="else">
                {!v.body}
            </aura:set>
        </aura:if>
        <span class="assistiveText">{!v.title}</span>
    </a>
</aura:component>
```

Fig. 18

```
<div style="margin:20px;">
    <div style="display:inline-block;width:50%;vertical-align:top;">
        <code>ui:checkboxMenuItem</code>
        <ui:menu>
            <ui:menuTriggerLink class="checkboxMenuLabel"
aura:id="checkboxMenuLabel" label="Select your favorite teams"/>
            <ui:menuList aura:id="checkboxMenu" class="checkboxMenu">
                <ui:checkboxMenuItem class="checkboxItem1" aura:id="checkboxItem1"
label="San Francisco 49ers"/>
                <ui:checkboxMenuItem class="checkboxItem2" aura:id="checkboxItem2"
label="Seattle Seahawks"/>
                <ui:checkboxMenuItem class="checkboxItem3" aura:id="checkboxItem3"
label="St. Louis Rams"/>
                <ui:checkboxMenuItem class="checkboxItem4" aura:id="checkboxItem4"
label="Arizona Cardinals" disabled="true" selected="true"/>
            </ui:menuList>
        </ui:menu>
        <p><ui:button class="checkboxButton" aura:id="checkboxButton"
press="{!c.getMenuSelected}" label="Check the selected menu items"/></p>
        <p><ui:outputText class="result" aura:id="result" value="Which items get
selected"/></p>
    </div>
</div>
<hr/>
<p/> menuTrigger.cmp
<aura:component access="GLOBAL" support="GA" extensible="true"
extends="ui:popupTrigger" description="A trigger that expands and collapses a menu,
used in a ui:menu component.">
    <aura:registerevent access="GLOBAL" name="menuTriggerPress"
type="ui:menuTriggerPress" description="The event that is fired when the trigger is
clicked."/>
    <aura:handler name="click" action="{!c.onClick}"/>

<aura:set attribute="trigger">
        <div id="{!globalId}" aura:id="menuTrigger" aria-haspopup="true">
            {!v.body}
        </div>
    </aura:set>
</aura:component>
```

Fig. 19 Checkbox Menu Example & menuTrigger.cmp

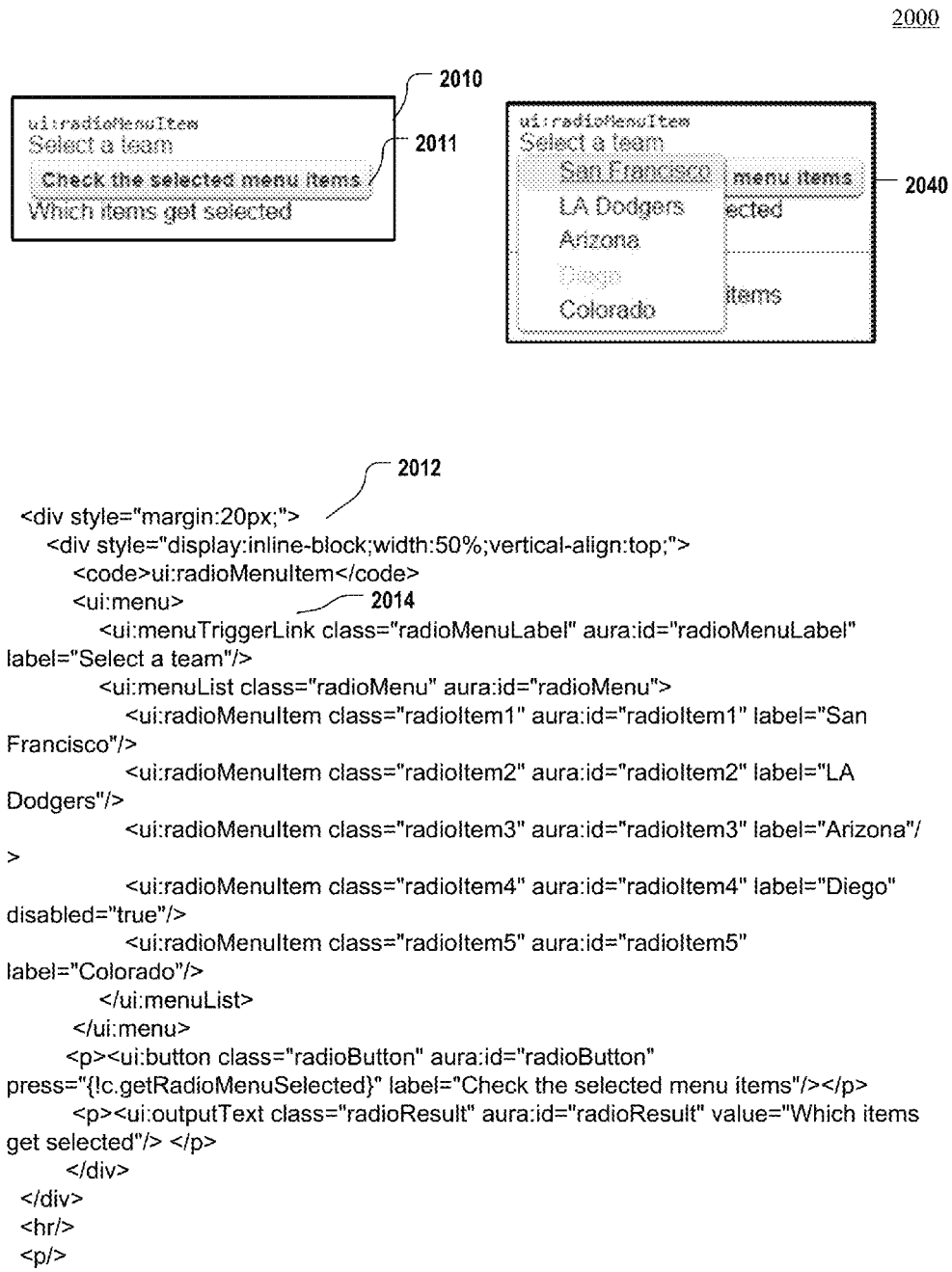
Fig. 20 Radio Menu Example

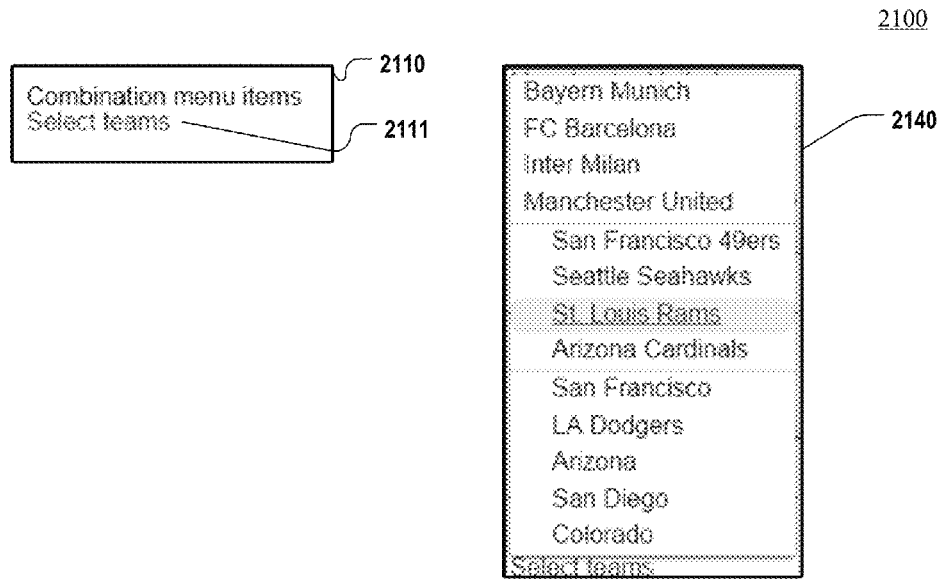

```
<div style="margin:20px;">
    <div style="display:inline-block;width:50%;vertical-align:top;">
        Combination menu items
        <ui:menu>                    /— 2114
            <ui:menuTriggerLink aura:id="mytrigger" label="Select teams"/>
            <ui:menuList>
                <ui:actionMenuItem label="Bayern Munich" click="{!c.updateLabel}"/>
                <ui:actionMenuItem label="FC Barcelona" click="{!c.updateLabel}"/>
                <ui:actionMenuItem label="Inter Milan" click="{!c.updateLabel}"/>
                <ui:actionMenuItem label="Manchester United" click="{!c.updateLabel}"/>
                <ui:menuItemSeparator/>
                <ui:checkboxMenuItem label="San Francisco 49ers"/>
                <ui:checkboxMenuItem label="Seattle Seahawks"/>
                <ui:checkboxMenuItem label="St. Louis Rams"/>
                <ui:checkboxMenuItem label="Arizona Cardinals"/>
                <ui:menuItemSeparator/>
                <ui:radioMenuItem label="San Francisco"/>
                <ui:radioMenuItem label="LA Dodgers"/>
                <ui:radioMenuItem label="Arizona"/>
                <ui:radioMenuItem label="San Diego"/>
                <ui:radioMenuItem label="Colorado"/>
            </ui:menuList>
        </ui:menu>
    </div>
</div>
```

Fig. 21 Combination of Menu Types

2200

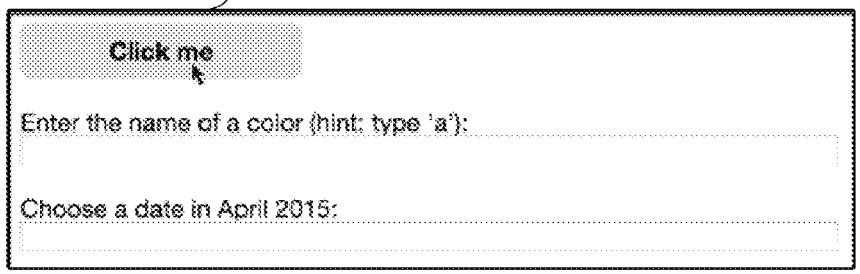
2205

2210
------ popupDemo.app ------

```
<aura:application support="PROTO">
   <div class="sample">
      <consoletest:modalDialog triggerText="Click me" targetText="You've opened the modal dialog" targetButtonLabel="OK"/>
   </div>
   <div class="sample">
      <consoletest:autocomplete triggerText="Enter the name of a color (hint: type 'a'):"/>
   </div>
   <div class="sample">
      <consoletest:datePicker triggerText="Choose a date in April 2015:" year="2015" month="3"/>
   </div>
</aura:application>
```

Fig. 22 popupDemo.app

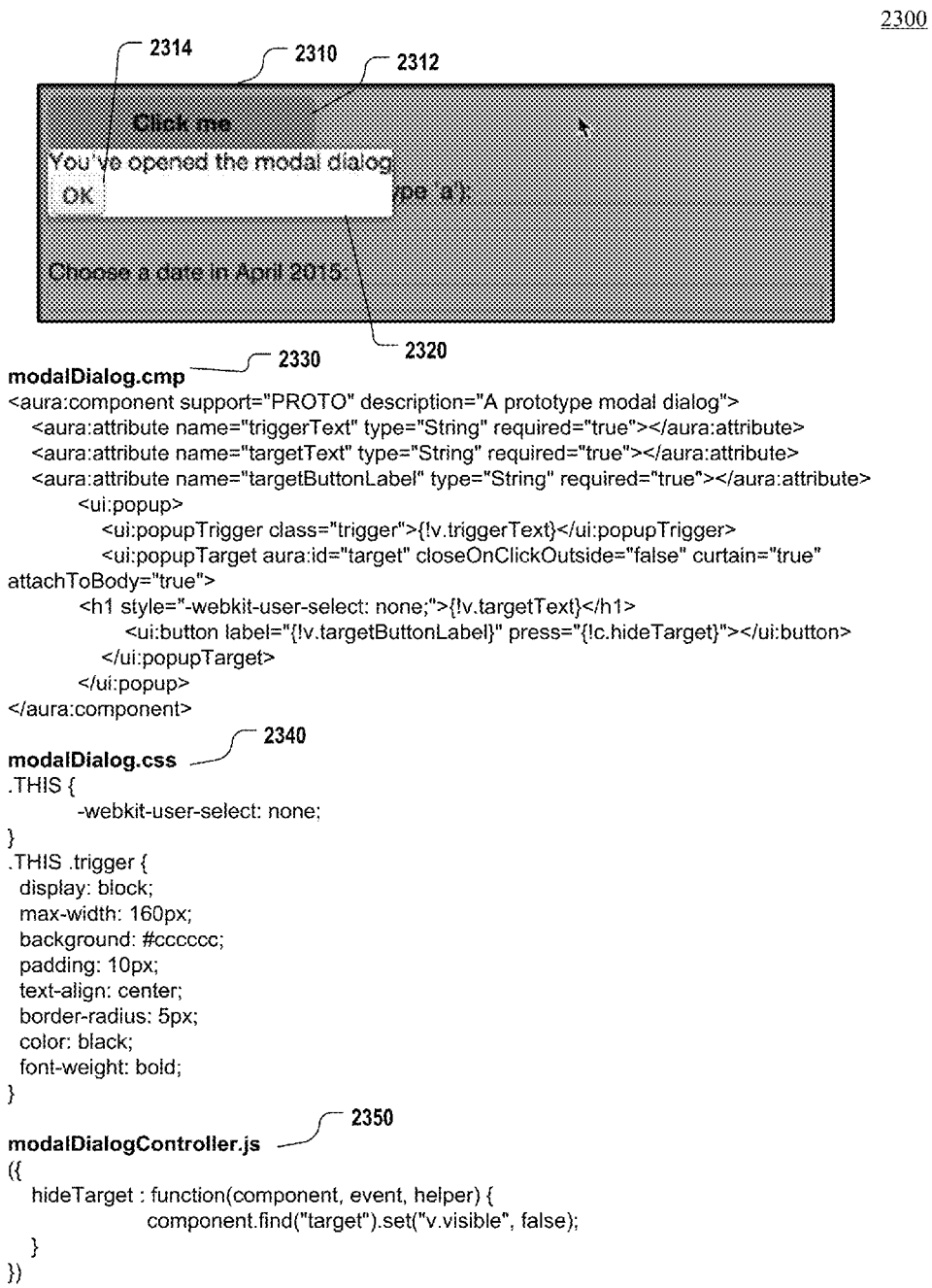

```
modalDialog.cmp
<aura:component support="PROTO" description="A prototype modal dialog">
    <aura:attribute name="triggerText" type="String" required="true"></aura:attribute>
    <aura:attribute name="targetText" type="String" required="true"></aura:attribute>
    <aura:attribute name="targetButtonLabel" type="String" required="true"></aura:attribute>
        <ui:popup>
            <ui:popupTrigger class="trigger">{!v.triggerText}</ui:popupTrigger>
            <ui:popupTarget aura:id="target" closeOnClickOutside="false" curtain="true" attachToBody="true">
                <h1 style="-webkit-user-select: none;">{!v.targetText}</h1>
                <ui:button label="{!v.targetButtonLabel}" press="{!c.hideTarget}"></ui:button>
            </ui:popupTarget>
        </ui:popup>
</aura:component> modalDialog.css
.THIS {
        -webkit-user-select: none;
}
.THIS .trigger {
  display: block;
  max-width: 160px;
  background: #cccccc;
  padding: 10px;
  text-align: center;
  border-radius: 5px;
  color: black;
  font-weight: bold;
} modalDialogController.js
({
    hideTarget : function(component, event, helper) {
                component.find("target").set("v.visible", false);
    }
})
```

Fig. 23 modalDialog.cmp, modalDialog.css & modalDialogController.js

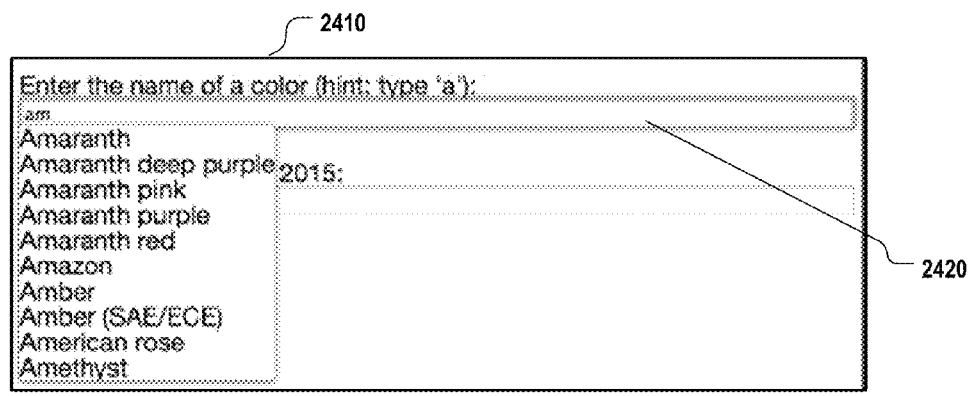

Autocomplete.cmp 2430
```
<aura:component support="PROTO" description="A prototype modal dialog">
  <aura:attribute name="triggerText" type="String" required="true"></aura:attribute>
  <aura:attribute name="suggestions" type="String[]"></aura:attribute>
  <aura:attribute name="term" type="String"></aura:attribute>

<aura:handler name="change" value="{!v.term}" action="{!c.showSuggestions}"/>

<ui:popup>
    <ui:outputText value="{!v.triggerText}"/>
    <ui:popupTrigger class="trigger">
      <ui:inputText aura:id="term" value="{!v.term}" updateOn="keyup" size="100"/>
    </ui:popupTrigger>
    <ui:popupTarget aura:id="target" curtain="false" attachToBody="true" autoPosition="false">
      <ul>
            <aura:iteration items="{!v.suggestions}" var="suggestion">
              <li>
                <ui:outputText value="{!suggestion}" click="{!c.suggestionSelected}"/>
              </li>
            </aura:iteration>
      </ul>
    </ui:popupTarget>
  </ui:popup>
</aura:component>
```

Fig. 24 Autocomplete.cmp autocompleteController.js
({
       showSuggestions : function(component, event, helper) {
              var allSuggestions = [
                    'Acid green',
                    'Aero',
                    'Aero blue',
                    'African violet',
                    'Air Force blue (RAF)',
                    'Air Force blue (USAF)',
                    'Air superiority blue',
                    'Alabama crimson',
                    'Alice blue',
                    'Alizarin crimson',
                    'Alloy orange',
                    'Almond',
                    'Amaranth',
                    'Amaranth deep purple',
                    'Amaranth pink',
                    'Amaranth purple',
                    ...

'Avocado',
                    'Azure',
                    'Azure (web color)',
                    'Azure mist',
                    'Azureish white'
              ];
              var suggestions = [];
              var term = component.find('term').get('v.value');
              if (term) {
                    term = term.toLowerCase();
                    for (var i = 0, l = allSuggestions.length; i < l; i++) {
                        if (allSuggestions[i].toLowerCase().startsWith(term)) {
                            suggestions.push(allSuggestions[i]);
                        }
                    }
              }
              component.set('v.suggestions', suggestions);
              component.find('target').set('v.visible', true);
      },
      suggestionSelected : function(component, event, helper) {
            component.set('v.term', event.getSource().get('v.value'));
            component.find('target').set('v.visible', false);
      }
})

Fig. 25 autocompleteController.js

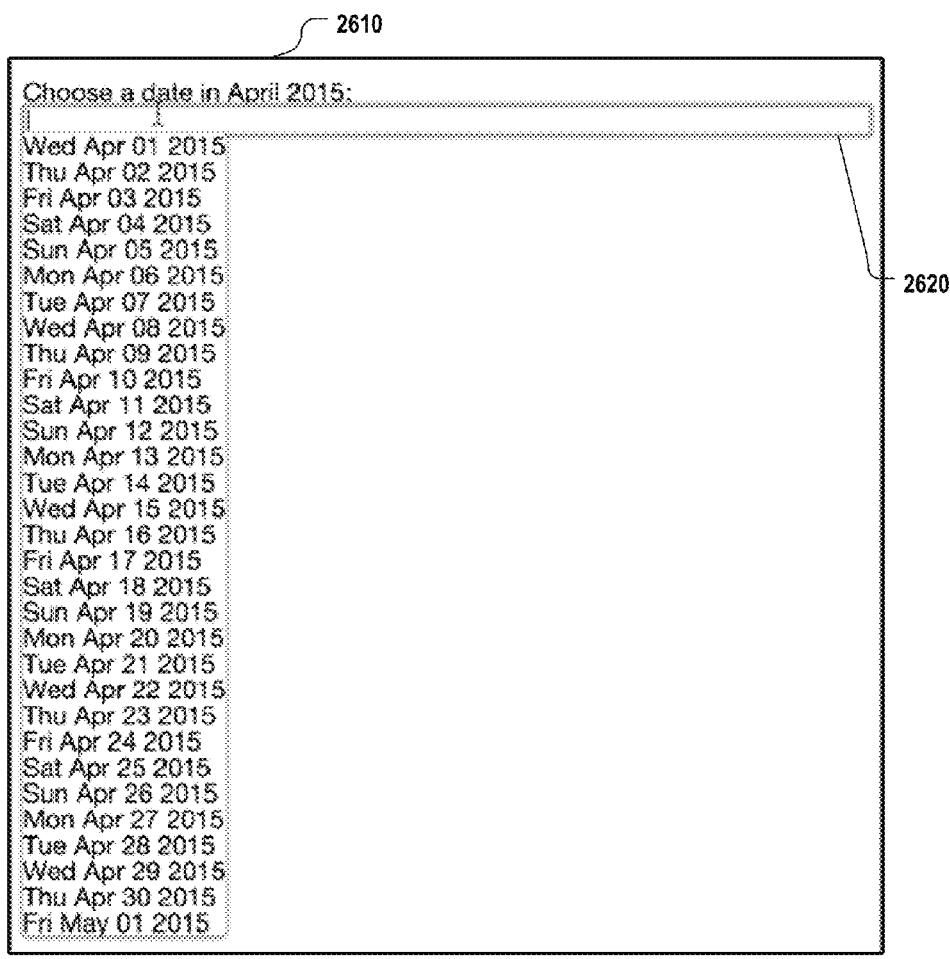
Fig. 26 Date Picker UI Example datepicker.cmp ─ 2710

```
<aura:component support="PROTO" description="A prototype modal dialog">
    <aura:attribute name="triggerText" type="String" required="true"></aura:attribute>
    <aura:attribute name="year" type="String"></aura:attribute>
    <aura:attribute name="month" type="String"></aura:attribute>
    <aura:attribute name="selectedDate" type="String"></aura:attribute>
    <aura:attribute name="allDates" type="String[]"></aura:attribute>

<aura:handler name="init" value="{!this}" action="{!c.init}"/>

<ui:popup>    ─ 2720
        <ui:outputText value="{!v.triggerText}"/>
        <ui:popupTrigger class="trigger">
            <ui:inputText aura:id="date" value="{!v.selectedDate}" click="{!c.showDates}" size="100"/>
        </ui:popupTrigger>
                                                                                    ─ 2730
        <ui:popupTarget aura:id="target" curtain="false" attachToBody="true" autoPosition="false">
            <ul>
                <aura:iteration items="{!v.allDates}" var="date">
                    <li>
                        <ui:outputText value="{!date}" click="{!c.dateSelected}"/>
                    </li>
                </aura:iteration>
            </ul>
        </ui:popupTarget>
    </ui:popup>
</aura:component>
``` datepickercontroller.js ─ 2740

```
({
        init : function(component, event, helper) {
                var year = component.get('v.year');
                var month = component.get('v.month');
                var daysInMonth = new Date(year, month, 0).getDate();
                var allDates = [];
                for (var day = 1; day <= daysInMonth; day++) {
                        var d = new Date(year, month, day);
                        allDates.push(d.toDateString());
                }
                component.set('v.allDates', allDates);
        },
        showDates : function(component, event, helper) {
                component.find('target').set('v.visible', true);
        },
        dateSelected : function(component, event, helper) {
            component.set('v.selectedDate', event.getSource().get('v.value'));
                component.find('target').set('v.visible', false);
        }
})
```

Fig. 27 datepicker.cmp & datepickerController.js

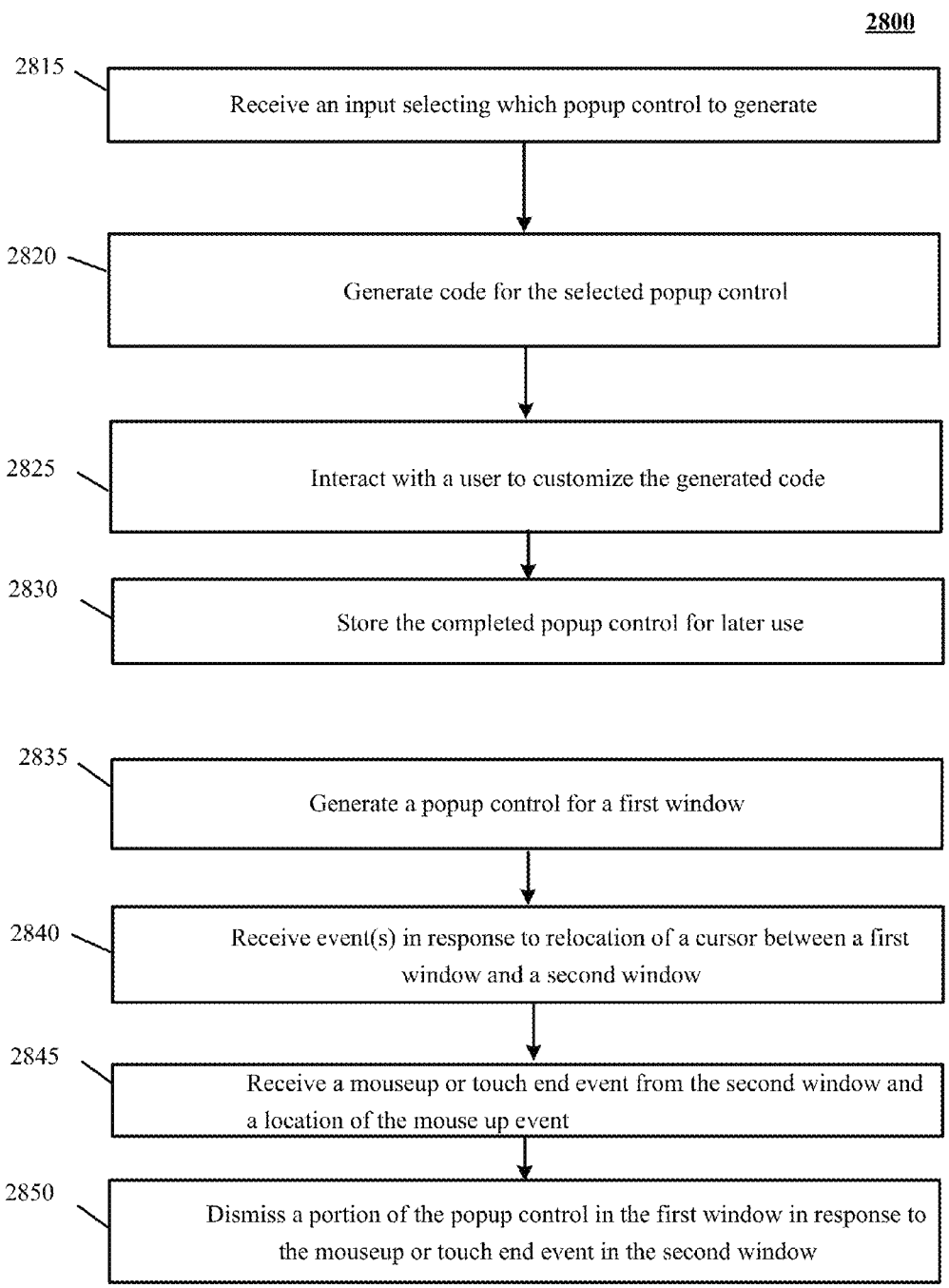
FIG. 28 Popup Control Workflows

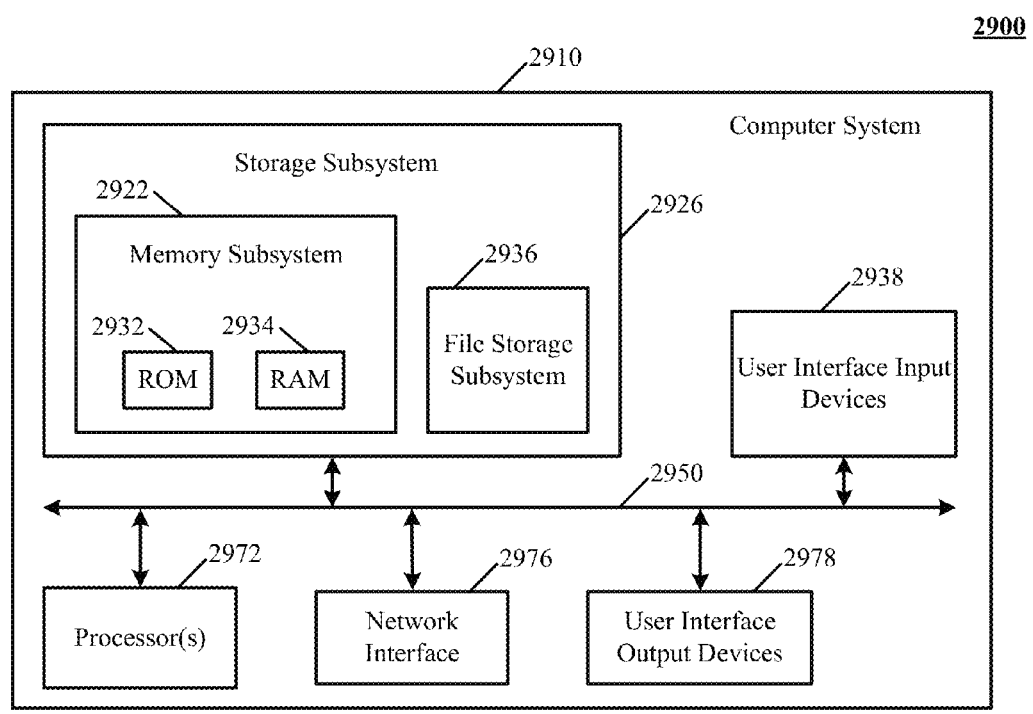
FIG. 29 Computer System

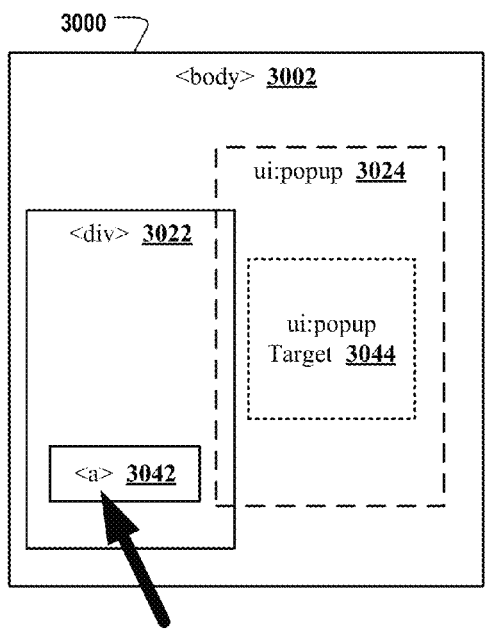
Fig. 30 Block Diagram
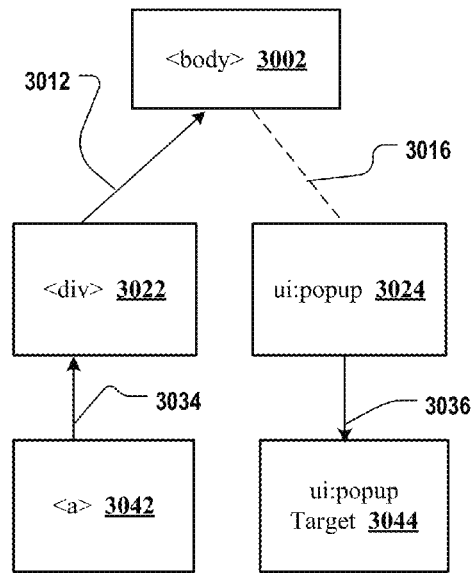
Fig. 31 Flow of Click Event
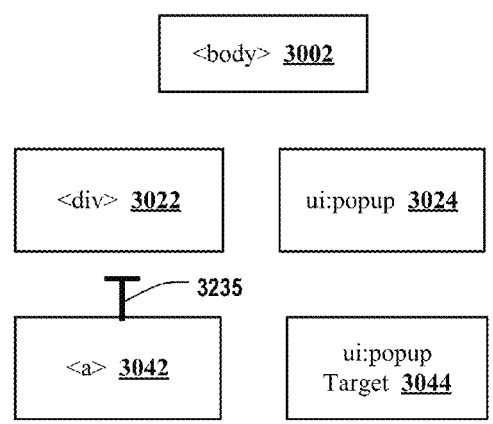
Fig. 32 Click Event Blocked

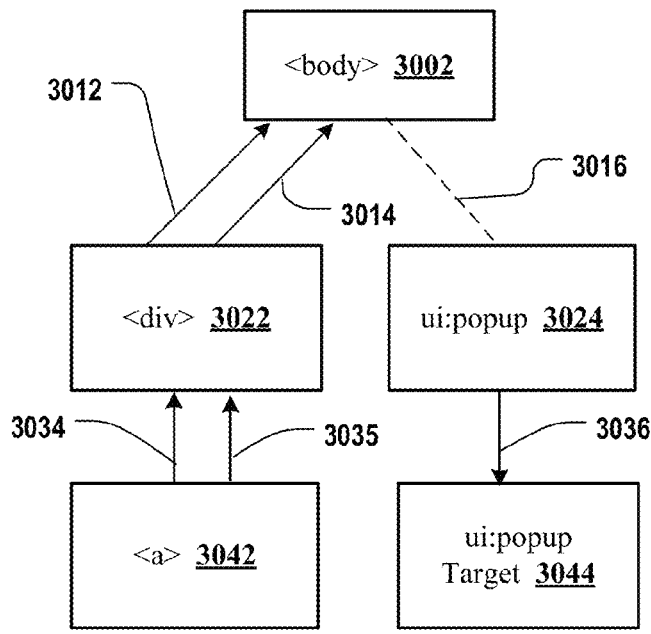
Fig. 33 Click Event and Mouseup Event
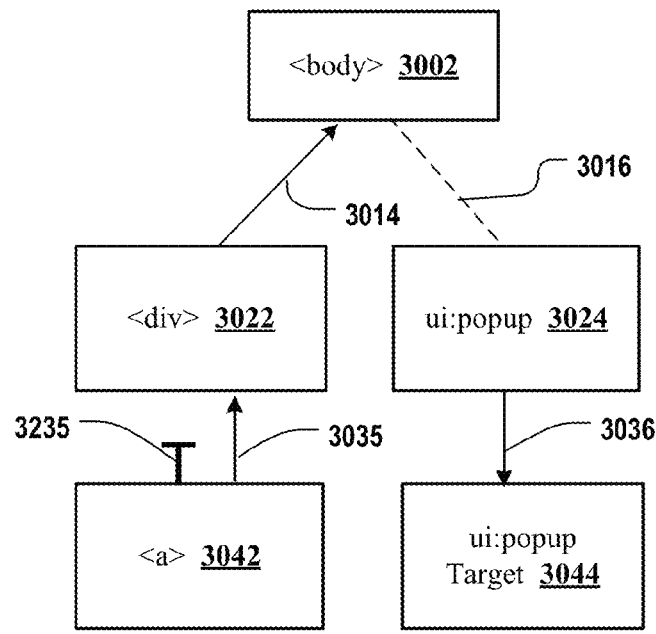
Fig. 34 Click Event Blocked & Mouseup Event Propagates Through

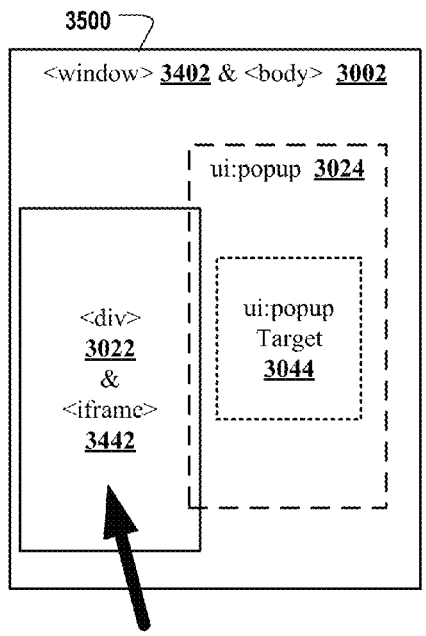
Fig. 35 Block Diagram
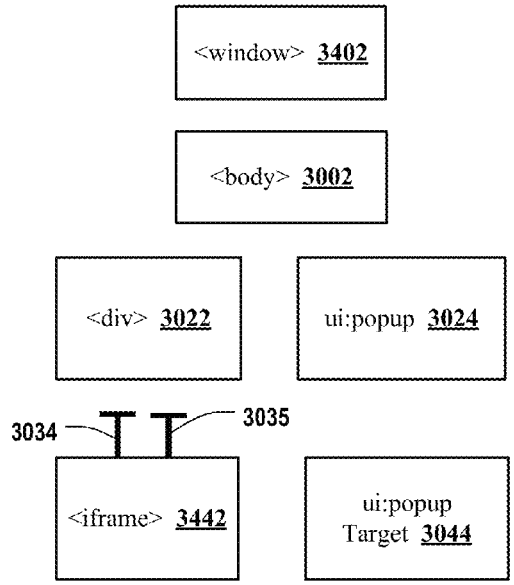
Fig. 36 Click Event & Mouseup Event with iFrame
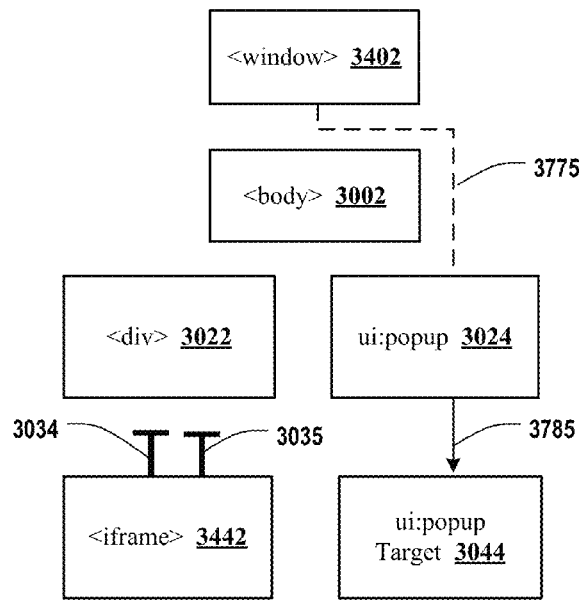
Fig. 37 Blur Event, Click Event & Mouseup Event with iFrame

SYSTEMS AND METHODS OF BYPASSING SUPPRESSION OF EVENT BUBBLING FOR POPUP CONTROLS

INTRODUCTION

The technology disclosed describes systems and methods for implementing extensible browser executable components, such as popup controls for action, checkbox and radio button dropdown menus, modals, dialogs, date pickers and autocompletes. The disclosed technology systems and methods can also be used for rendering executable components for mobile application interfaces. The technology further discloses systems and methods for providing support for developers whose goal is to render specific implementations of browser executable components.

The technology disclosed also describes systems and methods for bypassing suppression of DOM click event bubbling for a popup controls for action, checkbox and radio button dropdown menus, modals, dialogs, date pickers and autocompletes; and discloses systems and methods for implementing modal interaction between an iframe and a popup control.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 4 shows an example DOM tree.

FIG. 5 shows an example component file and rendering file for popup.

FIG. 6 shows an example controller file for popup.

FIG. 7 and FIG. 8 show excerpts from a helper file for popup.

FIG. 9 shows an example component file for popup trigger.

FIG. 10 shows an example controller file and renderer file for popup trigger.

FIG. 11 and FIG. 12 show excerpts from a helper file for popup trigger.

FIG. 13 shows an example component file for popup target.

FIG. 14 shows an example controller file and renderer file for popup target.

FIG. 15, FIG. 16 and FIG. 17 show excerpts from a helper file for popup target.

FIG. 18 shows an example popup menu, collapsed and expanded, and a menu trigger link component file.

FIG. 19 shows an example checkbox popup menu, collapsed and expanded, and a menu trigger component file.

FIG. 20 shows an example radio button popup menu, collapsed and expanded, and example implementation code.

FIG. 21 shows an example combination popup menu, collapsed and expanded, and example implementation code.

FIG. 22 shows an example dialog popup, and example popup demonstration code.

FIG. 23 shows an example active modal dialog popup, and component, css and controller files for modal dialog.

FIG. 24 shows an example autocomplete, and a component file for the autocomplete.

FIG. 25 shows an example autocomplete controller file.

FIG. 26 shows an example date picker UI.

FIG. 27 shows example date picker component and controller files.

FIG. 28 shows example popup workflows.

FIG. 29 an example computer system used for a popup control development subsystem.

FIG. 30 shows a block diagram for an example link selection.

FIG. 31 shows a flow for a click event when a link is selected.

FIG. 32 shows the flow for a blocked click event when a link is selected.

FIG. 33 shows the flow for a click event and a mouseup event.

FIG. 34 the flow for a blocked click event and a propagated mouseup event.

FIG. 35 shows a block diagram for an example iframe selection.

FIG. 36 shows a click event and mouseup event with an iframe selection.

FIG. 37 shows a blur event, click event and mouseup event with an iframe selection.

DETAILED DESCRIPTION

Figure 1:
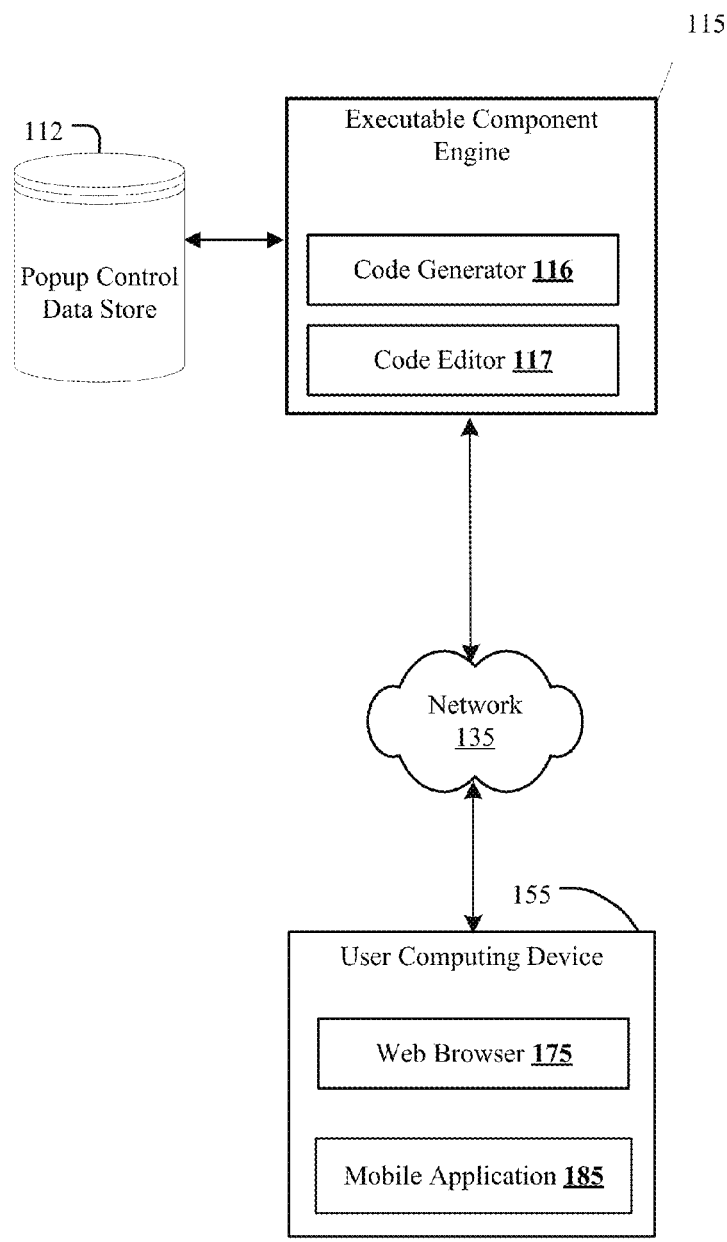
FIG. 1 illustrates one implementation of a popup control development subsystem.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Web browsers and mobile device applications retrieve, present and traverse information resources on the World Wide Web. Although browsers are primarily intended to use the World Wide Web, they can also be used to access information provided by web servers in private networks or files in file systems. The primary purpose of a web browser is to bring information resources to the user, allowing them to view the information, and then access other information. Once a resource has been retrieved, the web browser will display it.

Operators of a web page or mobile application access displayed information using various components such as contextual menus (also called popup, pop-up menu, autocomplete or modal). These menus appear upon user interaction in a graphical user interface (GUI), such as a right-click mouse operation. A contextual menu offers a limited set of choices that are available in the current state, or context, of the web browser or application interface. Usually the available choices are actions related to a selected object, presented with a combination of text and symbols to represent choices. By clicking on one of the symbols or text, the operator is selecting the instruction that the symbol represents. The choices presented to the operator are automatically modified according to the current context in which the operator is working.

A contextual menu is a window that suddenly appears (pops up) when an operator selects an option with a mouse or presses a special function key. Usually, the pop-up window contains a menu of commands and stays on the screen only until the operator selects one of the commands. It then disappears. A special kind of pop-up window is a pull-down menu, which appears just below the item selected, as if an operator had pulled it down.

A modal window is a graphical control element subordinate to a web browser or application's main window which creates a mode where the main window can't be used. The modal window is a child window that requires users to interact with it before it can return to operating the parent application, thus preventing the workflow on the browser or application main window. Modal windows are often called heavy windows or modal dialogs because the window is often used to display a dialog box. Modal windows are commonly used in GUI systems to command user awareness and to display emergency states. On the Web, they are often used to show images in detail.

Another browser executable component is an autocomplete. Autocomplete works so that when the writer writes the first letter or letters of a word, the program predicts one or more possible words as choices. If the word she intends to write is included in the list she can select it, for example by using the number keys. If the word that the user wants is not predicted, the writer must enter the next letter of the word. At this time, the word choice(s) is altered so that the words provided begin with the same letters as those that have been selected. When the word that the user wants appears it is selected, and the word is inserted into the text. In another form of autocomplete, words most likely to follow the just written one are predicted, based on recent word pairs used. Various word prediction algorithms allow the user to enter their own words into word prediction dictionaries either directly, or by "learning" words that have been written.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The disclosed technology provides systems and methods for rendering extensible browser executable popup controls. The disclosed technology systems and methods can also be used for rendering executable components for mobile application interfaces. The technology disclosed includes providing support for developers, who design user interface environments, providing extensible browser executable popup controls (menus, auto-completes, dialogs, [date pickers] and modals) for use on desktop and laptop computers, and users on mobile devices, such as iPads and iPhones, etc.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

Accessibility

Web accessibility means that people with disabilities can use the Web. More specifically, Web accessibility means that people with disabilities can perceive, understand, navigate, and interact with the Web, and that they can contribute to the Web. Web accessibility also benefits others, including older people with changing abilities due to aging. Web accessibility encompasses the disabilities that affect access to the Web, including visual, auditory, speech, cognitive, and neurological disabilities.

Much of the focus on Web accessibility has been on the responsibilities of Web developers. Making a Web site accessible can be simple or complex, depending on many factors, including the development tools and environment. Web Content Accessibility Guidelines (WCAG) developed through the W3C process in cooperation with individuals and organizations around the world, with a goal of proving a single shared standard for web content accessibility that meets the needs of individuals, organizations, and governments internationally.

With global mobile phone use at an all-time high, there has been a surge of interest in developing websites that are accessible from a mobile device. Similarly, making websites accessible for people with disabilities is an integral part of high quality websites, and in some cases a legal requirement. For example, government-provided Web content must be accessible.

Many mobile web developers need to learn about design issues for people with disabilities, as well as mobile web design best practices. Users of mobile devices and people with disabilities experience similar barriers when interacting with web content. For example, mobile phone users have a hard time if a website's navigation requires the use of a mouse because they typically only have an alphanumeric keypad. Similarly, desktop computer users with a motor disability will have a hard time using a website if they can't use a mouse. Additionally, people with disabilities sometimes use mobile devices to access websites. Overlaps exist for mobile design issues and disability design issues.

The disclosed technology provides accessible-ready extensible browser executable components for developing accessible popup controls (for example: menus, autocompletes, dialogs and modals).

Customization Environment

Component-based development emphasizes the separation of concerns with respect to the wide-ranging functionality available throughout a given system. It is a reuse-based approach to defining, implementing and composing loosely coupled independent components into systems.

FIG. 1 illustrates one implementation of a popup control development subsystem 100 that includes a popup control data store 112, an executable component engine 115 with code generator 116 and code editor 117, and a network 135. Popup control development subsystem 100 further includes a user computing device 155. In other implementations, subsystem 100 may not have the same elements as those listed above and/or may have other/different elements instead of, or in addition to, those listed above.

The popup control data store 112 includes attribute descriptions for menus, autocompletes, date pickers, and dialogs. The popup control data store 112 stores configuration options for target components such as menu options, and configurations for trigger components such as menu names and alternative text, as well as accessibility attributes for components. Accessibility information identifies details about keystrokes and related actions that can be applied to the popup, and can include text patterns related to the popup. The supplemental accessibility information in the data store can include names, titles and description for UI objects and frames, and input specifications for assistive technology products that make it possible for individuals to control their computers through means other than a standard keyboard or pointing device. Examples include alternative keyboards—featuring larger- or smaller-than-standard keys or keyboards, alternative key configurations, and keyboards for use with one hand; and electronic pointing devices—used to control the cursor on the screen without use of hands. Input devices also can include ultrasound, infrared beams, eye movements, nerve signals, or brain waves. Additional input options can include sip-and-puff systems—activated by inhaling or exhaling; wands and sticks—worn on the head, held in the mouth or strapped to the chin and used to press keys on the keyboard; joysticks—manipulated by hand, feet, chin, etc. and used to control the cursor on screen; trackballs—movable balls on top of a base that can be used to move the cursor on screen, and touch screens that allow direct selection or activation of the computer by touching the screen, making it easier to select an option directly rather than through a mouse movement or keyboard. Touch screens can either be built into a computer monitor or can be added onto a computer monitor.

The popup control data store 112 can include a set of rules that map inputs from various assistive technology products to popup actions. These rules include allowing a full range of timing for individual keystrokes, except where the underlying function requires input that depends on the path of the user's movement and not just the endpoints. Navigational mechanisms can be controlled by accessible devices so that UI components have the same functionality within a set of web pages, even when using keystrokes instead of mouse clicks or screen touches. Additionally, control signals can stimulate web pages to appear and operate in predictable ways, so that when any component receives focus, it does not initiate an unexpected change of context.

An executable component engine 115 receives requests for action from a user computing device 155, via the network 135. The executable component engine 115 evaluates the request to determine what type of popup has been activated, and accesses details about keystroke mapping and related actions for the component, as well as text patterns related to the executable component stored in the popup control data store 112. The executable component engine 115 delivers a popup whose actions are consistent with the implementation of the received web page or mobile application, using details stored in the popup control data store 112. In one example dropdown menu action, a request to select an "About Us" menu on a business website triggers a dropdown target list of menu choices: "Overview", "Awards", "Blogs", "Careers", "Press and News", and "Sustainability".

The executable component engine 115 responds to the user computing device 155 via the network, in a format that matches the signal type received from the user (i.e. accessible when the component has been configured to support that option). In an alternative offline implementation, a user computing device 155 can be directly linked to the executable component engine 115 that delivers browser extensible component functionality for previously-stored configurations.

In some implementations, the modules of popup control development subsystem 100 can be of varying types including workstations, servers, computing clusters, blade servers, server farms, or any other data processing systems or computing devices. Modules can be communicably coupled to the data store via a different network connection. For example, executable component engine 115 can be coupled to a direct network link. In some implementations, it may be connected via a WiFi hotspot.

In some implementations, network(s) 135 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

User computing device 155 includes a web browser 175 and/or a mobile application 185. In some implementations, user computing device 155 can be a personal computer, laptop computer, tablet computer, smartphone, personal digital assistant (PDA), digital image capture devices, and the like.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Popup Control Development

The popup control can be used in the context of a development subsystem to extend popup functionality. A development system code editor can receive input from a user to select between the menu, auto complete, date picker, and dialog popup controls; and to invoke the code generator to generate corresponding base popup container, trigger component and target component code. The code developer can provide inputs to be used by the development subsystem to complete the base popup control, the trigger component and the target component and implement the selected menu, auto complete, date picker, or dialog popup control; and store the completed popup control for later use.

An extensible popup control interacts with a controller-and-view interface. The view includes pages and components, and the controller describes the logic for a component. The interface responds to transition events to cause the popup control to collapse, expand, show and hide the popup, and to recognize a trigger-select. The trigger component, when invoked, causes the controller to invoke the target component; and the target component, when invoked, reveals and enumerates selectable target actions.

Figure 2:
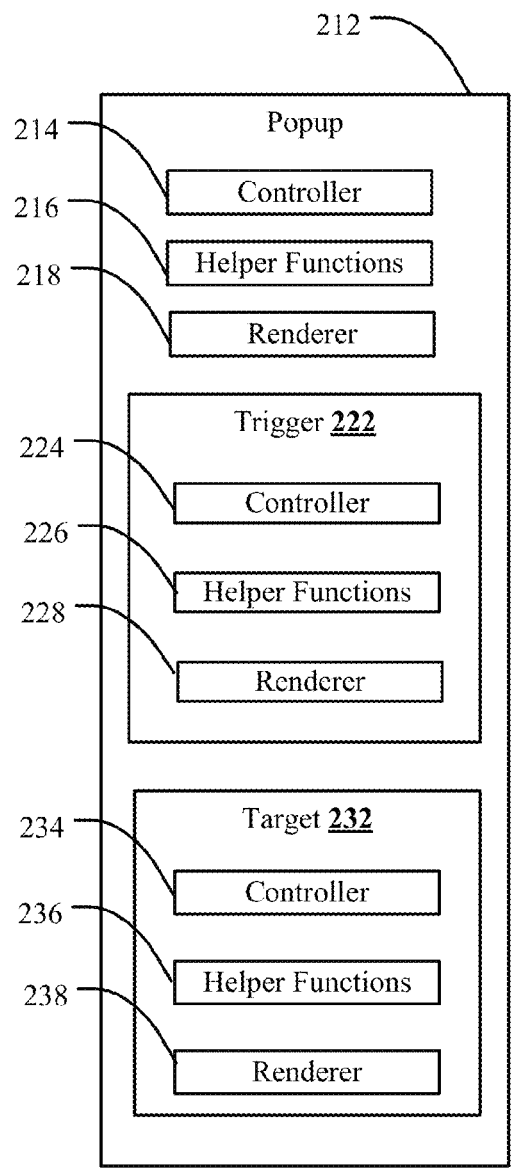
FIG. 2 shows an example popup structure block diagram.

Modular code design supports developers who build UIs with executable components. A base popup controller, and related trigger and target components can be implemented using modules. FIG. 2 shows the relationship between code elements in one implementation of an extensible browser popup 212, and the related trigger 222 and target 232 components. The controller handles events within a component. It's a client-side JavaScript file that defines the functions for the component's actions. Each action function takes in three parameters: the component to which the controller belongs, the event that the action is handling, and the helper if it's used. Browser DOM element events starting with on, such as onclick or onkeypress, can be wired to a controller action. Developers can wire browser events to controller actions. The renderer for a component handles DOM events for that component, as discussed later. The developer can customize rendering behavior, creating a client-side renderer in a component bundle. Helper resources contain functions that are shared by the controller and renderer for a component. Helper functions enable specialization of tasks, such as processing data and firing server-side actions. Popup 212, trigger 222, and target 232 each include a controller 214 224 234, a renderer 218 228 238, and helper functions 216 226 236.

Figure 3A:
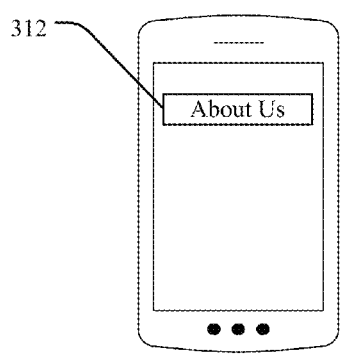
FIG. 3A shows an example collapsed popup menu on a mobile device.
Figure 3B:
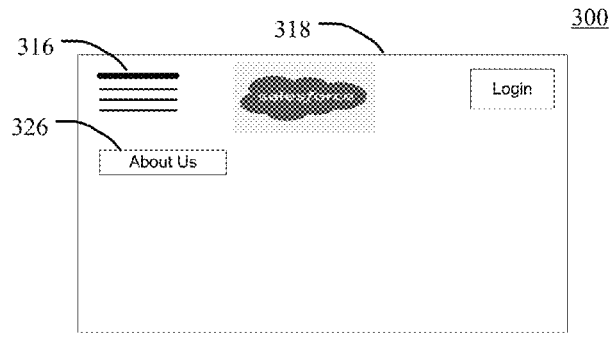
FIG. 3B shows an example collapsed popup menu in a browser window.
Figure 3C:
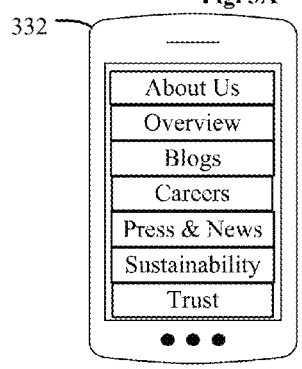
FIG. 3C shows an example expanded popup menu on a mobile device.
Figure 3D:
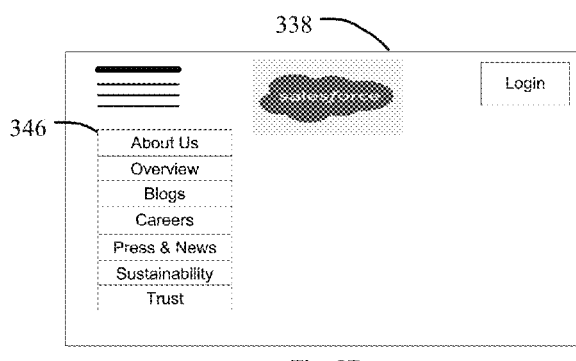
FIG. 3D shows an example expanded popup menu in a browser window.
Figure 3E:
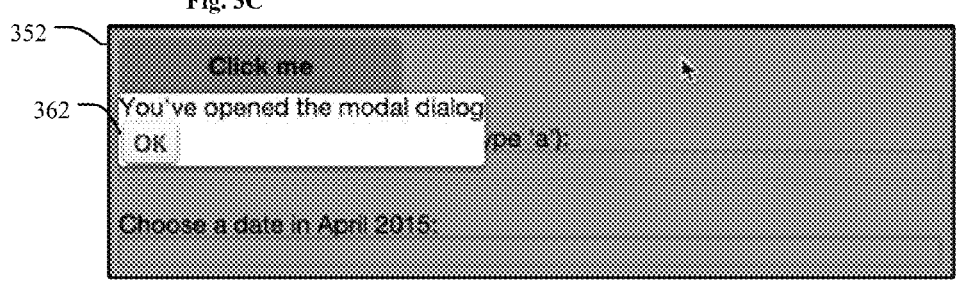
FIG. 3E shows an example modal dialog.
Figure 3F:
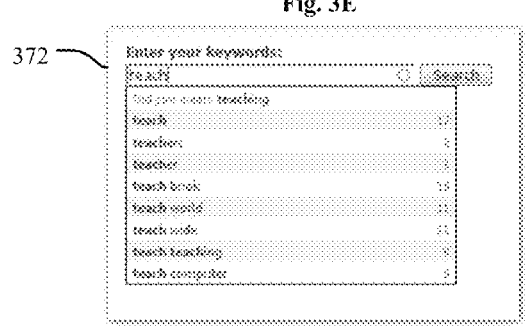
FIG. 3F shows an example autocomplete.

FIG. 3A displays an example collapsed menu implemented using the popup UI component for a mobile application and FIG. 3B shows the same example collapsed menu for a web browser. A 'show' action can be stimulated by clicking "About Us" menu 312. The menu, initially displayed in the 'collapsed' state, 'triggers' the expanded dropdown menu 332 shown in FIG. 3C, when an action is signaled by the user of mobile application 185. Similarly, a web browser 175 on a user computing device 155 would display, in the 'collapsed' state, an "About Us" menu 326. Selection of "About Us" 'triggers' an expanded dropdown menu 346. A 'hide' action can be 'triggered' by selecting the "About Us" menu 326 while the expanded dropdown menu 346 shown in FIG. 3D is active. That is, the 'expanded' menu choices "Overview", "Awards", "Blogs", "Careers", "Press and News", and "Sustainability" can be 'hidden' upon activation of the 'hide' action. In the example shown in FIG. 3D, a repeated selection of "About Us" by a user could initiate the UI to perform a toggle action—alternately showing and hiding the dropdown target list. FIG. 3E displays an example dialog 352 configured as a modal—that is, the dialog is configured to capture control of the user interface until the 'OK' trigger component 362 gets selected. FIG. 3F shows an autocomplete 372 popup in which words most likely to follow the one just entered ("teach" in this example) are predicted, based on the word entered.

Event Handling

Event propagation with DOM event handling does not work well with popup controls. There are at least two problems with the DOM model of bubbling events, such as mouse clicks, from an active window to a pop-up control that is temporarily inactive. The desired behavior is for the popup control to be aware of the click event and responsively hide a target from view. Problems arise because active windows that process click events typically block propagation or bubbling of the click event that they can handle. The popup control never learns that a click event happened, because propagation was blocked. Another problem arises from use of iframes, which capture click and other mouse events and never pass them outside the iframe. By design, iframes do not propagate click events or other mouse events. The technology described below offers different solutions to these problems: responding to mouseup events that are more likely to propagate freely than click events, as a proxy for click events; and responding to blur events that are generated on the window that holds iframe(s) when a click event occurs in an iframe, also as proxy for click events. The popup controls described implement these work-arounds to the DOM event handling model.

Handlers respond to interface events as they occur in event-driven systems. A component registers in its markup that it may fire an event. Events are fired from controller actions that are triggered by a user interacting with the user interface.

The Document Object Model (DOM) is a cross-platform and language-independent convention for representing and interacting with objects in HTML, XHTML, and XML documents. The nodes of documents are organized in a tree structure, called a DOM tree, and the objects in the DOM tree may be addressed and manipulated.

DOM events allow event-driven programming languages like JavaScript, JScript, ECMAScript, VBScript and Java to register various event handlers/listeners on the element nodes inside a DOM tree. The disclosed technology includes component renderers that produce HTML DOM elements within the browser; and these DOM events are mapped to development framework events, as HTML tags are mapped to components.

The disclosed rendering service of the popup control development subsystem takes in-memory component state and updates the component in the DOM. FIG. 4 shows an example of a DOM 400 with a window node 414 that includes a document node 422 node, an event node 424, and frames 426 nodes. The document node 422 includes a body 423 which includes nodes: anchors 432, classes 434, tags 436 and images 438. Additional nodes can be present on a DOM tree, depending on the structure of the system being represented.

In a browser document, DOM events typically bubble from the DOM element of origin, up through the DOM tree, and finally to the root node of the DOM tree/document. Any function that is included as part of that bubbling sequence may halt the bubbling process so that subsequent DOM elements are not notified of the DOM event.

For example, a menu action that occurs when a menu trigger is clicked will receive a DOM click event. If a developer's menu action function includes code that cancels bubbling of the DOM click event, then the menu target and any other containing DOM elements are not notified of the DOM click event. A block diagram 3000 shown in FIG. 30 shows the relationship between a body 3002, a div 3022, a link 3042, and a ui:popup 3024 with a ui:popup target 3044. FIG. 31 shows the flow of a click event. When a user clicks link 3042, an event bubbles up to body 3002 via path 3034 and path 3012. UI:popup 3024 listens via path 3016 for this event to come from body 3002, and upon receipt of the event, will hide ui:popup target 3044. It is a common practice for a function to cancel the click event before it reaches body 3002, as shown in FIG. 32 via terminator 3235. In this case, when a user clicks a link 3042, and the developer's function cancels the click event, and it does not reach the body 3002, the ui:popup target 3044 is not hidden. This fragile design may lead to unanticipated consequences, such as a menu target not being dismissed when a menu action is clicked, since the menu target was never notified of the original click event. An example developer function that handles a click outside of the menu, and another example of a custom event that handles a click inside a menu are shown below. Both developer functions cancel the propagation of click events using a call to stopPropagation.

```
/* Example of custom developer's code */
// custom event on a link outside of the menu, happens to cancel the events propagation
// Prevents click event from closing menu with typical menu implementation
document.getElementById('custom_link').addEventListener('click', function(e) {
    alert('Custom click event.');
    e.preventDefault( );
    e.stopPropagation( );
    return false;
});
// Custom handling of click event inside menu (perhaps developer is doing some checks first)
// Prevents click event from closing menu with typical menu implementation
document.getElementById('menu_link').addEventListener('click', function(e) {
    alert('Custom handling of ui:popup menu content click');
    e.preventDefault( );
    e.stopPropagation( );
    return false;
});
```

Some alternate method of dismissing the popup target when the content is interacted is required. A more stable approach is to listen for mouseup events on body to dismiss ui:popup target. In FIG. 33, the flow of both a click and a mouseup event are shown. When a user clicks a link, a click event bubbles up, and a mouseup event propagates to UI:popup, which upon receipt of the mouseup event, hides the ui:popup target. Using this disclosed technology, mouseup or touchstart DOM events that originate from the target content will cause the popup target to be dismissed. This means that injected content can continue to cancel event bubbling and the popup will still be able to dismiss the popup target when the user interacts with the popup target content. FIG. 34 shows the flow of both the click event and the mouseup event. Even though the click event is canceled before it reaches body 3002, as shown by terminator 3235, the mouseup event propagates via path 3034 and 3014, and the ui:popup target renderer 238 can listen for, and receive the mouseup via path 3016, and hide the ui:popup target 3044.

Iframes can be embedded in documents. When a user clicks on a DOM element in an iframe, the DOM event bubbling is different from the case where no iframes are present. When no iframe is present there is only 1 DOM tree in the window. When N iframes are present there are N+1 DOM trees present: 1 DOM tree in the top level window and 1 DOM tree in each of the N nested windows that is associated with each iframe. When clicking on a DOM element in an iframe, the DOM event bubbles up through the DOM tree in that iframe's window and is never received by the top level window's DOM tree. This behavior causes a problem with popup target interaction. If a popup target is visible (as a result of the popup trigger having been clicked) and the user clicks in an iframe, neither the popup target nor the popup target's window is notified about the DOM click event. There is no way the popup target can be notified that the DOM click event was fired. The end result for the user is that the popup target continues to be displayed even though the intention is that the popup target should be modal, i.e. dismissed when clicking outside the popup target.

A block diagram 3500 shown in FIG. 35 shows the relationship between an iframe 3442, a window 3402 and a body 3002, and a ui:popup 3024 with a ui:popup target 3044.

FIG. 36 shows the flow of a click event and a mouseup event when an iframe gets selected. That is, when a user clicks iframe 3442, no click event bubbles up to body 3002 as shown by path 3034 terminator, and no mouseup event bubbles up to body, as shown by path 3034 terminator. In this case, when a user clicks the iframe 3442, no event reaches the body 3002 or the popup 3024, so the ui:popup target 3044 is not hidden.

The disclosed technology solves this problem by attaching a listener for the DOM blur event to the top level window. When a user clicks outside the top level window, for instance in an iframe, then a blur event gets fired. The ui:popup 3024 invokes a blur listener and the popup dismisses the target when the blur event registers via path 3775 in FIG. 37. The end result is that the user perceives the popup target as having modal interaction. That is, when a user clicks the iframe 3442 in FIG. 37, the iframe fires a blur event on the window. A blur event is fired on the window because the focus of that window is shifted from itself to the window of the iframe. The ui:popup 3024 listens for the blur event on the window and hides the ui:popup target 3044. An example implementation that adds an event listener for blur is shown below, along with two examples of developer functions that use blur listening for hiding a target menu when a user clicks outside the menu, and when a user click inside the menu.

```
/* Hide menu when user focuses or clicks on iframe,
causing a blur event on window */
window.addEventListener('blur', function( ) {
    menu.style.display = 'none';
});
/* Hide the menu so developers can work with click events */
// hide the menu when clicked in menu
menu.addEventListener('mouseup', function(e) {
    menu.style.display = 'none';
    e.preventDefault( );
});
// hide the menu when user clicks outside of the menu
body.addEventListener('mouseup', function(e) {
    if (e.target.id !== 'menu_link') {
        menu.style.display = 'none';
    }
});
```

The popup control development subsystem 100 can be set up to automatically render components so the developer need not know more about rendering unless they need to customize the default rendering behavior for a component. The developer can design components that read from the DOM outside a renderer but only modify the DOM using a renderer, as described below.

Browser DOM element events starting with on, such as onclick or onkeypress, can be wired to a controller action. Developers can wire browser events to controller actions. The developer can customize rendering behavior, creating a client-side renderer in a component bundle. The disclosed popup control development subsystem includes the base implementations for the render( ), rerender( ), afterRender( ), and unrender( ) functions that are part of the rendering lifecycle. When an event is fired, it may trigger actions to change data and call rerender( ) on affected components. The rerender( ) function enables components to update themselves based on updates to other components that have occurred since they were last rendered. The popup control development subsystem automatically calls rerender( ) if the data in a component has been updated. A developer need only call rerender( ) if they haven't updated the data but still want to rerender the component. Calling superRerender( ) chains the rerendering to the components in the body attribute. The afterRender( ) function enables developers to interact with the DOM tree after the rendering service has inserted DOM elements.

Popup 212, an extensible popup with a trigger that controls its visibility, is specified in popup.cmp 510; it registers popup event handlers/listeners on the element nodes inside the DOM tree. A popupTriggerPress event fires when the popup trigger is selected. Other components may also fire this event to simulate a trigger press. Another popup event is registered with the name popupTargetShow. The trigger fires this event to show the target. Other components may also fire this event to show the target. A third popup event is registered with the name popupTargetHide. The trigger fires this event to hide the target, and other components may also fire this event to hide the target. A popupKeyboardEvent fires when a user interacts with a popup via the keyboard. One additional event is registered with the name refresh with a description, "fire to refresh the popup".

The popup controller 214 includes popupRenderer 514 which updates the DOM tree to reflect popup actions, as described above. popupController.js 610, a client-side file, defines the functions for the popup's actions. Each action function call takes in three parameters: the component to which the controller belongs, the event that the action is handling, and the associated helper. In this case the associated helper, popupHelper.js 710 in FIG. 7, includes classes for handling triggers, targets and keyboard events: handleTriggerPress 740 sets the visibility of the target; handleTargetShow 750 sets the visibility to true for the target; handleTargetHide 760 sets the visibility to false to hide the target; and handleKeyboardEvent 770 delegates a popup keyboard event to the target. In FIG. 8, the popup helper includes event handler code customizable using a code editor for classes that handle trigger events. For example, setTriggerEventHandlers 840 adds handler functions for onTriggerPress, onTargetShow, onTargetHide and onKeyboardEvent.

Popup structure 200 includes a trigger component 222 that includes a trigger component file, popupTrigger.cmp 910, which sets up a global title text field for display when the mouse pointer hovers over the component; and provides the option of overriding the default HTML and trigger event handling. StopClickPropogation 920 prevents the click event from bubbling up the DOM tree, preventing any parent handlers from being notified of the event. popupTrigger.cmp 910 includes registration of popupTriggerPress 930, popupTargetShow 940, popupTargetHide 950 and popupKeyboardEvent 960 events in the DOM. A span container 980 is included for assistive text for accessibility. Popup trigger controller 224 is implemented with popupTriggerControllerjs 1010 which specifies actions for client-side popup trigger events, such as onClick 1020 and onPopupToggle 1030. A trigger renderer, popupTriggerRenderer.js 1040 in FIG. 10, handles DOM events related to trigger actions, with afterRender 1050 and rerender 1060. Rerender gets called when changes occur; to handle changes to the visibility of the trigger. Popup trigger component helper, popupTriggerHelper.js 1110 in FIG. 11 and FIG. 12, defines actions for a trigger such as show and hide, described earlier, and registers trigger events on the DOM. A preEventFiring 1140 function allows developers to respond directly to registered DOM events. handleClick 1210, handleTriggerPress 1220, showTarget 1230, hideTarget 1240, handlePopupToggle 1250 and firePopupEvent 1260 handle specific trigger-related actions.

A target container gets displayed in response to a trigger event. Popup structure 200 includes a target component 232: with target controller 234, helper functions 236, and renderer 238. Target controller 234 is implemented with popupTarget.cmp 1310 listed in FIG. 13 and popupTargetController.js 1410 in FIG. 14.

The extensible target component offers flexibility for the developer. For example, closeOnTabKey 1320 indicates whether to close the target window when the tab key is selected. Target menu positioning is controllable: autoPosition 1330 provides the option to automatically move the popup target up when there is not enough space at the bottom of the display; while manualPosition 1340 overrides automatic positioning. attachToBody 1350 moves the target event up to HTML body level to ensure that target event processing does not get blocked by other events. To assure correct event bubbling, when used in a mobile context, it is recommended that 'curtain' be set to true to prevent nested iframes from consuming the closeOnClickOutside 1360 event. The default visibility setting for the target is false, hiding the target menu. closeOnClickInside 1370 closes the target window when the user clicks or taps inside the target. A CSS class can be initially applied to a target using a preTransitionClass attribute 1372 and then removed prior to toggling the visible class. This attribute is available to developers to allow for CSS transitions.

PopupTarget.cmp 1310 includes registration of events in the DOM: popupCollapse 1382, popupExpand 1384, popupKeyboardEvent 1386 and doClose 1388. DoClose 1388 provides the option for the developer to tell the target to close itself. PopupKeyboardEvent 1390 enables keyboard interaction with the target to support accessibility.

The purpose of target rendering is to handle DOM events for the target, with popupTargetRenderer.js 1414 in FIG. 14 which includes target rerender function 1418 that handles the visibility of the target when its visible attribute changes.

Target helper functions support popup target components. Excerpts of popupTargetHelper.js are listed in FIG. 15, FIG. 16 and FIG. 17. For example, getElementCache function 1512 retrieves associated html stored in the executable component engine 115 so the query need only happen once each time the target utilizes this helper function. Target helper position function 1614 and positionAsBodyChild function 1710 support target positioning (i.e. positioning a menu dropdown so the target menu list displays on the web page, instead of possibly hanging off the bottom of the page). Additional helper functions include addDismissEvents 1714 and removeDismissEvents 1718 functions that manage event handling when a popup target expands or collapses. A window blur event 1716 is included to hide/show a popup target when clicking on an iframe, as events do not bubble up and out of an iframe. A handleKeyboardEvent function 1719 provides component support for hooking into keyboard events.

Example Popup Controls

Popup menu control types include action menus, checkbox menus which support multiple target choices, and radio menus which support a single selection from a target list. FIG. 18 shows a collapsed action menu 1810. The action menu is implemented as an extension of popupTrigger, described earlier. That is, the code for action menu actionMenuItem 1812, uses UI component menu, which makes use of menuTriggerLink 1814; and menuTriggerLink component definition 1816, extends from menuTrigger 1916. In turn, menuTrigger 1914, listed in FIG. 19, extends from popupTrigger to create a trigger that expands and collapses a menu. The menu expands when the user clicks the trigger in this case, the text "Select your favorite team" shown in collapsed action menu 1810 to produce the expanded action menu 1860.

FIG. 19 shows a collapsed checkbox menu 1910. By following the trail of the code for the checkbox menu checkboxMenuItem 1912, we see that the checkbox menu is also implemented as an extension of popupTrigger, described earlier. That is, the menu to trigger a checkbox makes use of menuTriggerLink 1914, and menuTriggerLink 1816, extends from menuTrigger 1916, listed in FIG. 19, which extends from popupTrigger. The menu expands when the user clicks the trigger in this case, the text "Check the selected menu items" 1911 in collapsed checkbox menu 1910 to trigger the expanded checkbox menu 1940 that supports multiple selections.

FIG. 20 shows a radio menu 2010 that supports a single selection from a target list. We can see, by following the trail of the code for radio menu radioMenuItem 2012, that the radio menu is also implemented as an extension of popupTrigger, described earlier. That is, the menu to trigger a radio menu makes use of menuTriggerLink 2014, and menuTriggerLink 1816, extends from menuTrigger 1916, which extends from popupTrigger. The menu expands when the user clicks the trigger text "Check the selected menu items" 2011 in collapsed radio menu 2010 to display the expanded radio menu 2040 that supports a single selection from a target list.

Action menus, checkbox menus and radio menus are implemented in a combined menu 2110 in FIG. 21. Once again, by following the trail of the code 2112, we see that the combination menu is implemented as an extension of popupTrigger, described earlier using menuTriggerLink 2114; and menuTriggerLink 1816 extends from menuTrigger 1916 which extends from popupTrigger. The menu expands when the user clicks the trigger text "Select teams" 2111 in collapsed menu 2110 to produce the expanded combined menu 2140.

The UI developer can connect list items to actions in a client-side controller so that selection of the item triggers an action. When the trigger is selected (i.e. via a mouse click or "touch" on a touch screen mobile device), the target list is displayed, and associated actions occur. From the example described earlier, "About Us" could be a trigger to signal a dropdown target list of menu choices: "Overview", "Awards", "Blogs", "Careers", "Press and News", and "Sustainability". In one example, a developer can configure the client-side controller to update the trigger label when a menu item is clicked.

```
({
    updateTriggerLabel: function(cmp, event) {
        var triggerCmp = cmp.find("trigger");
```

-continued

```
        if (triggerCmp) {
            var source = event.getSource( );
            var label = source.get("v.label");
            triggerCmp.set("v.label", label);
        }
    }
})
```

To toggle the popup using a custom trigger, a code developer can configure the module to fire the popupTargetToggle event and set show to true or false.

```
({
    hideTarget : function(component) {
        var evt = $A.get('e.ui:popupTargetToggle');
        evt.setParams({
            component : component,
            show : false
        });
        evt.fire( );
    }
})
```

When using popupTargetToggle, a developer needs to register this event in their component.
<aura:registerevent name="popupTargetToggle" type="ui:popupTargetToggle"/>

To prevent a popup from closing when a user clicks outside of the popup control, the code developer can set closeOnClickOutside on popupTarget to false. This ensures that the popup can be closed only by clicking the trigger. To enable closing of the popup when a user clicks inside the popup, the programmer can set closeOnClickInside on popupTarget to true.

A modal creates a mode that requires users to interact with it before the application can return to the workflow on the browser or application main window. FIG. 22 shows an example window 2205 that demonstrates examples for a modal dialog via popupDemo.app 2210. Functionally, after clicking on Click me 2312, the modal dialog displays, "You've opened the modal dialog" 2320 and no further action occurs until the OK 2314 gets selected. The component definition for the modal dialog prototype, modalDialog.cmp 2330, in FIG. 23, shows the use of ui:popup, ui:popupTrigger and ui:popupTarget. Some optional attributes on ui:popupTarget are used to control the behavior of the target: <ui:popupTarget aura:id="target" closeOnClickOutside="false" curtain="true" attachToBody="true">; closeOnClickOutside="false" means that clicking outside the target will not close the target. curtain="true" means that a gray overlay is used to "gray out" the rest of the page when the target is visible. attachToBody="true" means that the target is a child of the body element in the DOM. This is done so that the curtain that is used overlays the entire page instead of a part of the page. The visible attribute of the target is set to control hiding the target in modalDialogController.js 2350. Details of the visual presentation are specified in modalDialog.css 2340.

In FIG. 24, an autocomplete 2410 prompts an application user to "Enter the name of a color (hint: type 'a'):" in a field 2420. The prototype autocomplete.cmp 2430 includes code: <ui:popupTarget aura:id="target" autoPosition="false">. The developer has set autoPosition="false" to false so that the upper left hand side of the target is guaranteed to be positioned just after the trigger. If autoPosition="true" had been set instead, then the target would have been moved upward if the target autocomplete list were long enough to overflow off the bottom of the page. FIG. 25 shows autocompleteController.js 2510, which includes the list of colors for display, and the function that closes the target after the color has been selected, by setting visible to false for the target.

An example date picker popup 2610, shown in FIG. 26, prompts the application user to "Choose a date in April 2015", with the result to be displayed in field 2620. The component definition, datePicker.cmp 2710 shown in FIG. 27, implements the date picker as ui:popup 2720. Similar to the example for selecting a color in the autocomplete example, the autoPosition="false" 2730 defines the popup target's position <ui:popupTarget aura:id="target" autoPosition="false">. datePickerController.js 2740 initializes the variables for the date picker and displays the selected date in the field, and closes the target after the date has been selected, by setting visible to false for the target.

Popup Control Development Workflow

FIG. 28 is a flowchart 2800 of one implementation of a popup control development subsystem. Flowchart 2800 can be implemented by one or more processors configured to receive or retrieve information, process the information, store results, and transmit the results. Other implementations may perform the actions in different orders and/or with different, fewer or additional actions than those illustrated in FIG. 28. Multiple actions can be combined in some implementations.

At action 2810, the popup development control subsystem recognizes a controller-and-view interface that implements accessibility ready menu, auto complete, date picker, and dialog box popup controls. At action 2815, the subsystem receives an input selecting among at least menu, auto complete, date picker, and dialog popup controls to generate.

At action 2820, the subsystem generates code for completion of the selected menu, auto complete, date picker, or dialog popup control, including at least one popup control that includes a trigger component and a target component that interact with a controller-and-view interface to respond to transition events that cause the popup control to collapse, expand, show, and hide the popup, and to recognize a trigger-select. The trigger component, when invoked, causes the controller-and-view interface to invoke the target component; and the target component, when invoked, reveals and enumerates selectable target actions.

At action 2825, the popup development control subsystem recognizes a controller-and-view interface that implements a code editor that interacts with a user: accepting a user selection among the menu, auto complete, date picker, and dialog popup controls; and invoking the code generator to generate code for the base popup control, the trigger component and the target component corresponding to the user selection. At action 2830, the subsystem stores the completed popup control for later use.

Popup controls bypass suppression of DOM click event bubbling and interact with iframes. At action 2835, the popup development control subsystem generates a popup control for a first window. At action 2840, the control receives event(s) in response to relocation of a cursor between a first window and a second window. At action 2845, the control receives a mouseup or touch end event from the second window and a location of the mouse up event, and at action 2850, the control dismisses a portion of the popup control in the first window in response to the mouseup or touch end event in the second window.

For convenience, this flowchart is described with reference to the system that carries out a method. The system is not necessarily part of the method.

Computer System

FIG. 29 is a block diagram of an example computer system 2900 for implementing a popup control development subsystem. FIG. 29 is a block diagram of an example computer system, according to one implementation. The processor can be an ASIC or RISC processor. It can be an FPGA or other logic or gate array. It can include graphic processing unit (GPU) resources. Computer system 2910 typically includes at least one processor 2972 that communicates with a number of peripheral devices via bus subsystem 2950. These peripheral devices may include a storage subsystem 2926 including, for example, memory devices and a file storage subsystem, user interface input devices 2938, user interface output devices 2978, and a network interface subsystem 2976. The input and output devices allow user interaction with computer system 2910. Network interface subsystem 2976 provides an interface to outside networks, including an interface to corresponding interface devices in other computer systems.

User interface input devices 2938 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include the possible types of devices and ways to input information into computer system 2910.

User interface output devices 2978 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include the possible types of devices and ways to output information from computer system 2910 to the user or to another machine or computer system.

Storage subsystem 2924 stores programming and data constructs that provide the functionality of some or all of the modules and methods described herein. These software modules are generally executed by processor 2972 alone or in combination with other processors.

Memory 2922 used in the storage subsystem can include a number of memories including a main random access memory (RAM) 2934 for storage of instructions and data during program execution and a read only memory (ROM) 2932 in which fixed instructions are stored. A file storage subsystem 2936 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 336 in the storage subsystem 2926, or in other machines accessible by the processor.

Bus subsystem 2950 provides a mechanism for letting the various components and subsystems of computer system 2910 communicate with each other as intended. Although bus subsystem 2950 is shown schematically as a single bus, alternative implementations of the bus subsystem may use multiple busses.

Computer system 2910 can be of varying types including a workstation, server, computing cluster, blade server, server farm, or any other data processing system or computing device. Due to the ever-changing nature of computers and networks, the description of computer system 2910 depicted in FIG. 29 is intended only as one example. Many other configurations of computer system 2910 are possible having more or fewer components than the computer system depicted in FIG. 29.

Particular Implementations

In one implementation, a popup control development subsystem includes a code generator running on a processor that generates code that interacts with a controller-and-view interface and that implements accessibility ready menu, auto complete, date picker, and dialog popup controls. The generated code includes a popup control implemented by a base popup container that contains at least a trigger component and a target component that interact with the controller-and-view interface to respond to transition events, wherein the transition events cause the popup control to collapse, expand, show and hide the popup, and to recognize a trigger-select. The trigger component, when invoked, causes the controller-and-view interface to invoke the target component; and the target component, when invoked, reveals and enumerates selectable target actions. The disclosed popup control development subsystem includes a code editor that interacts with a user to accept a user selection among the menu, auto complete, date picker, and dialog popup controls and invokes the code generator to generate code for the base popup control, the trigger component and the target component corresponding to the user selection; accept user inputs to complete the base popup control, the trigger component and the target component and implement a completed popup control corresponding to the user selection; and store the completed popup control for later use.

In some implementations of the development subsystem the trigger component is accessibility ready by further including code with an HTML anchor tag, which is an actionable semantic; an HTML span container that holds assistive text; and a role attribute that identifies to accessibility technologies how to handle the trigger component.

The development subsystem of claim 1, wherein the target component further includes a positioning attribute that selects between automatic and manual positioning of the target component and enables reporting to accessibility technologies of a position at which the target component will be displayed. A feature of the disclosed implementation includes a target component which includes a pre-transition attribute that enables pre-selection emphasis of a section of the target component, responsive to a user input.

This system and other implementations of the technology disclosed can include one or more of the following features and/or features described in connection with additional systems disclosed. In the interest of conciseness, the combinations of features disclosed in this application are not individually enumerated and are not repeated with each base set of features.

Other implementations may include a method to perform any of the processes described above. Yet another implementation may include a tangible computer-readable memory including computer program instructions that cause a computer to implement any of the computer implemented methods described above.

In one implementation, a method of handling events generated by user interaction with a display includes a first window and a second window, and generating a popup control for the first window responsive to a first user event representing user interaction with the first window. In circumstances when the user relocates a cursor from the first window to the second window and the second window suppresses propagation of click events generated within the second window, the method includes receiving a mouseup or touch end event propagated from the second window and a location of the mouse up event, responsive to the mouseup in the second window, and triggering a dismiss class within the first window, wherein the dismiss class dismisses at least a portion of the popup control of the first window. In some implementations the first window is not contained within the second window and the second window is not contained within the first window. In other implementations the dismiss class further dismisses the whole popup control for the first window. The method can further include displaying a trigger component within the popup control; and receiving an event that selects the trigger component and displaying a target component that displays a list of choices responsive to selection of the trigger; wherein the portion of the popup control that is dismissed by the dismiss class is the target component, leaving the trigger component active after shift of focus to the second window.

In some implementations a method of handling events generated by user interaction with a display that includes a first window and a second iframe that is not contained within the first window, includes generating a popup control of the first window responsive to a first event user representing user interaction with the first window. In circumstances when the user relocates a cursor from the first window to the second iframe and the second iframe suppresses propagation of focus events generated within the second iframe, the method includes receiving a blur event in the first window resulting from a click event within the second iframe, and triggering a dismiss class within the first window responsive to a mouse or touch event in the second iframe, wherein the dismiss class dismisses at least a target portion of the generated popup control of the first window. In some implementations, the first window is an iframe that is not contained within and does not contain the second iframe. In other cases, the blur event issues to a container of the second iframe as a corollary to a focus event issuing for the second iframe; and the blur event propagates to the first window from the container. Further, the dismiss class dismisses the whole popup control for the first window.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of handling events generated by user interaction with a display that includes a first window and a second window, including:

generating a popup control for the first window responsive to a first user event representing user interaction with the first window;

in circumstances when the user relocates a cursor from the first window to the second window and a mousedown or touch start event, collectively referred to as the mousedown event, generated within the second window, is suppressed from propagation to the first window, receiving a mouseup or touch end event, collectively referred to as the mouseup event, propagated from the second window and a location of the mouseup event, responsive to the mouseup event in the second window, triggering a dismiss class within the first window, wherein the dismiss class dismisses at least a portion of the popup control of the first window.

2. The method of claim 1, wherein the first window is not contained within the second window and the second window is not contained within the first window.

3. The method of claim 1, wherein the dismiss class further dismisses the whole popup control for the first window.

4. The method of claim 1, further including:
displaying a trigger component within the popup control; and
receiving an event that selects the trigger component and displaying a target component that displays a list of choices responsive to selection of the trigger;
wherein the portion of the popup control that is dismissed by the dismiss class is the target component, leaving the trigger component active after shift of focus to the second window.

5. A tangible non-transitory computer readable storage media including computer program instructions that, when executed, implement the method of claim 1.

6. A computer implemented system of handling events generated by user interaction with a display that includes a first window and a second window, the computer implemented system including:
a processor, memory coupled to the processor, and program instructions stored in the memory that implement a method comprising:
generating a popup control for the first window responsive to a first user event representing user interaction with the first window;
in circumstances when the user relocates a cursor from the first window to the second window and a mousedown or touch start event collectively referred to as the mousedown event, generated within the second window, is suppressed from propagation to the first window,
receiving a mouseup or touch end event, collectively referred to as the mouseup event, propagated from the second window and a location of the mouse up event,
responsive to the mouseup event in the second window, triggering a dismiss class within the first window, wherein the dismiss class dismisses at least a portion of the popup control of the first window.

7. A method of handling events generated by user interaction with a display that includes a first window and a second iframe that is not contained within the first window, including:
generating a popup control of the first window responsive to a first user event representing user interaction with the first window;
in circumstances when the user relocates a cursor from the first window to the second iframe and a focus event generated from a mouse or touch event within the second iframe is suppressed from propagation to the first window,
receiving a blur event and a location of the blur event propagated from the second iframe, and
responsive to the blur event in the second iframe, triggering a dismiss class within the first window, wherein the dismiss class dismisses at least a target portion of the generated popup control of the first window.

8. The method of claim 7, wherein the first window is an iframe that is not contained within and does not contain the second iframe.

9. The method of claim 7, wherein the blur event issues to a container of the second iframe as a corollary to a focus event issuing for the second iframe; and the blur event propagates to the first window from the container.

10. The method of claim 7, wherein the dismiss class further dismisses the whole popup control for the first window.

11. The method of claim 7, further including:
displaying a trigger component within the popup control; and
receiving an event that selects the trigger component and displaying a target component that displays a list of choices responsive to selection of the trigger;
wherein the portion of the popup control that is dismissed by the dismiss class is the target component, leaving the trigger component active after shift of focus to the second iframe.

12. The method of claim 7, further including:
the second iframe being nested within a third iframe, the third iframe being nested within a common container of both the third iframe and the first window; and
setting a curtain attribute of the third iframe to true, thereby causing propagation of a blur event from the third iframe to the common container.

13. A tangible non-transitory computer readable storage media including computer program instructions that, when executed, implement the method of claim 7.

14. A computer implemented system of handling events generated by user interaction with a display that includes a first window and a second iframe that is not contained within the first window, the computer implemented system including:
a processor, memory coupled to the processor, and program instructions stored in the memory that implement a method comprising:
handling events generated by user interaction with a display that includes a first window and a second iframe that is not contained within the first window, including:
generating a popup control of the first window responsive to a first user event representing user interaction with the first window;
in circumstances when the user relocates a cursor from the first window to the second iframe and a focus event generated from a mouse or touch event within the second iframe is suppressed from propagation to the first window,
receiving a blur event and a location of the blur event propagated from the second iframe, and
responsive to the blur event in the second iframe, triggering a dismiss class within the first window, wherein the dismiss class dismisses at least a target portion of the generated popup control of the first window.

15. The system of claim 14, wherein the first window is an iframe that is not contained within and does not contain the second iframe.

16. The system of claim 14, wherein the blur event issues to a container of the second iframe as a corollary to a focus event issuing for the second iframe; and the blur event propagates to the first window from the container.

17. The system of claim 14, wherein the dismiss class further dismisses the whole popup control for the first window.

18. The system of claim 14, further including:
displaying a trigger component within the popup control; and
receiving an event that selects the trigger component and displaying a target component that displays a list of choices responsive to selection of the trigger;
wherein the portion of the popup control that is dismissed by the dismiss class is the target component, leaving the trigger component active after shift of focus to the second iframe.

19. The system of claim 14, further including:
the second iframe being nested within a third iframe, the third iframe being nested within a common container of both the third iframe and the first window; and
setting a curtain attribute of the third iframe to true, thereby causing propagation of a blur event from the third iframe to the common container.

* * * * *